US012567998B2

(12) United States Patent
Patterson

(10) Patent No.: US 12,567,998 B2
(45) Date of Patent: Mar. 3, 2026

(54) SYSTEMS AND METHODS FOR DATA SYNCHRONIZATION

(71) Applicant: Thomas J. Patterson, Fort Irwin, CA (US)

(72) Inventor: Thomas J. Patterson, Fort Irwin, CA (US)

( * ) Notice: Subject to any disclaimer, the term of this patent is extended or adjusted under 35 U.S.C. 154(b) by 0 days.

(21) Appl. No.: 19/274,430

(22) Filed: Jul. 18, 2025

(65) Prior Publication Data

US 2026/0052038 A1 Feb. 19, 2026

Related U.S. Application Data

(63) Continuation-in-part of application No. 18/805,418, filed on Aug. 14, 2024.

(51) Int. Cl.
*G06F 12/00* (2006.01)
*H04L 12/54* (2022.01)
*H04L 12/70* (2013.01)

(52) U.S. Cl.
CPC .. *H04L 12/5601* (2013.01); *H04L 2012/5681* (2013.01)

(58) Field of Classification Search
CPC ...... G06F 3/0619; G06F 3/065; G06F 3/0654; G06F 3/067
USPC ........................................................ 711/112
See application file for complete search history.

(56) References Cited

U.S. PATENT DOCUMENTS

| | | | | |
|---|---|---|---|---|
| 8,111,707 B2 * | 2/2012 | Riddle | .................... | H04L 69/04 |
| | | | | 711/170 |
| 8,279,885 B2 * | 10/2012 | Riddle | .................... | G06F 9/526 |
| | | | | 711/170 |
| 11,175,854 B2 | 11/2021 | Persson et al. | | |
| 11,379,123 B2 * | 7/2022 | Carlough | ............ | G06F 12/0638 |
| 2011/0136439 A1 * | 6/2011 | Tan | ........................ | H04W 24/08 |
| | | | | 455/67.11 |

(Continued)

FOREIGN PATENT DOCUMENTS

| | | |
|---|---|---|
| CN | 110622478 B | 11/2020 |
| CN | 118069753 A | 5/2024 |

*Primary Examiner* — Mohamed M Gebril
(74) *Attorney, Agent, or Firm* — Evergreen Valley Law GROUP; Kanika Radhakrishnan

(57) ABSTRACT

A system and method for data synchronization in a circular buffer architecture is disclosed. Embodiments describe a data synchronization mechanism, focusing on the efficient management of the circular buffer between producer and consumer processes. In an embodiment, a method uses a lapping technique to facilitate parallel processing without the need for locking mechanisms, ensuring continuous data flow and real-time responsiveness. Further, the method uses modulated lap indicators and associated paperclip indicators at each buffer slot to track access history and resolve race conditions. The method determines valid access sequences through indicator comparison, enabling reliable conflict resolution, computes warp distances to guide synchronization updates, and dynamically adjusts buffer configurations in response to system events. The method also preserves access states across interrupts or context switches, enabling seamless continuation of operations. The method provides a lock-free synchronization mechanism that enables precise state tracking and efficient coordination of concurrent buffer access.

25 Claims, 9 Drawing Sheets

100

(56) References Cited

U.S. PATENT DOCUMENTS

2011/0138259 A1*   6/2011   Tan ..................... H04B 1/0039
                                                 714/795
2023/0315655 A1*  10/2023   Choquette .............. G06F 9/522
                                                 711/154

* cited by examiner

MULTIPLE BUFFER LAPPING

SINGLE BUFFER LAPPING

Figure 7:
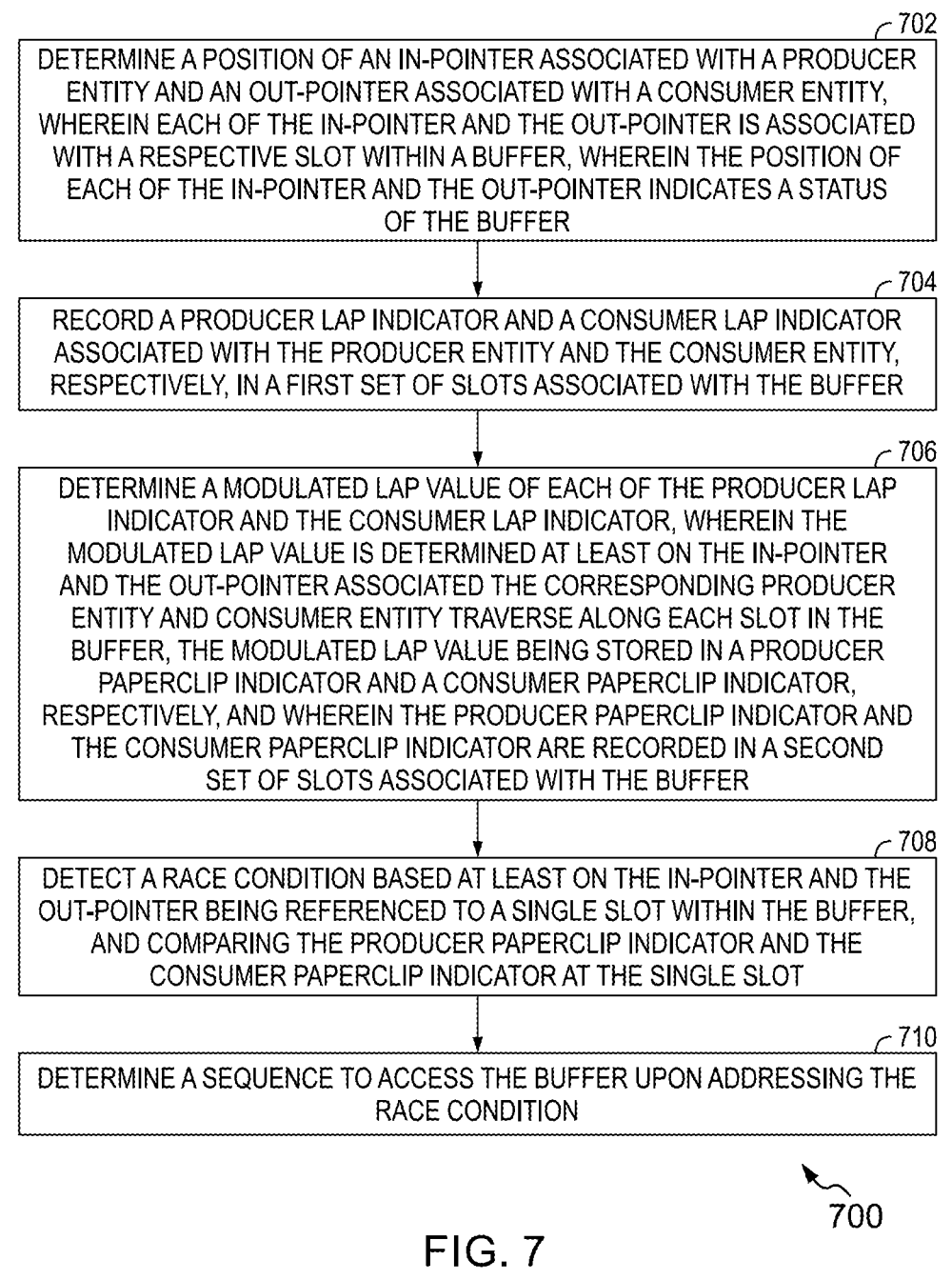

702

DETERMINE A POSITION OF AN IN-POINTER ASSOCIATED WITH A PRODUCER ENTITY AND AN OUT-POINTER ASSOCIATED WITH A CONSUMER ENTITY, WHEREIN EACH OF THE IN-POINTER AND THE OUT-POINTER IS ASSOCIATED WITH A RESPECTIVE SLOT WITHIN A BUFFER, WHEREIN THE POSITION OF EACH OF THE IN-POINTER AND THE OUT-POINTER INDICATES A STATUS OF THE BUFFER

704

RECORD A PRODUCER LAP INDICATOR AND A CONSUMER LAP INDICATOR ASSOCIATED WITH THE PRODUCER ENTITY AND THE CONSUMER ENTITY, RESPECTIVELY, IN A FIRST SET OF SLOTS ASSOCIATED WITH THE BUFFER

706

DETERMINE A MODULATED LAP VALUE OF EACH OF THE PRODUCER LAP INDICATOR AND THE CONSUMER LAP INDICATOR, WHEREIN THE MODULATED LAP VALUE IS DETERMINED AT LEAST ON THE IN-POINTER AND THE OUT-POINTER ASSOCIATED THE CORRESPONDING PRODUCER ENTITY AND CONSUMER ENTITY TRAVERSE ALONG EACH SLOT IN THE BUFFER, THE MODULATED LAP VALUE BEING STORED IN A PRODUCER PAPERCLIP INDICATOR AND A CONSUMER PAPERCLIP INDICATOR, RESPECTIVELY, AND WHEREIN THE PRODUCER PAPERCLIP INDICATOR AND THE CONSUMER PAPERCLIP INDICATOR ARE RECORDED IN A SECOND SET OF SLOTS ASSOCIATED WITH THE BUFFER

708

DETECT A RACE CONDITION BASED AT LEAST ON THE IN-POINTER AND THE OUT-POINTER BEING REFERENCED TO A SINGLE SLOT WITHIN THE BUFFER, AND COMPARING THE PRODUCER PAPERCLIP INDICATOR AND THE CONSUMER PAPERCLIP INDICATOR AT THE SINGLE SLOT

710

DETERMINE A SEQUENCE TO ACCESS THE BUFFER UPON ADDRESSING THE RACE CONDITION

SYSTEMS AND METHODS FOR DATA SYNCHRONIZATION

TECHNICAL FIELD

The present disclosure relates to data storage systems, and more particularly, relates to computer-implemented systems and methods for data synchronization.

BACKGROUND

Embedded systems are specialized computing systems designed to perform dedicated functions or manage specific tasks within larger systems. Unlike general-purpose computers that can run a wide range of applications, embedded systems are optimized for efficiency and reliability in their target application. They are integral to a variety of devices, ranging from simple household appliances like microwaves and washing machines to complex systems such as automotive control systems, medical devices, and industrial machines.

In the context of embedded systems, buffers play a crucial role in managing data flow between different components or systems. A buffer is a temporary storage area used to hold data while it is being moved from one place to another, ensuring smooth and efficient data handling. This is particularly important in embedded systems where data must often be processed in real-time or where the system interfaces with external devices that operate at different speeds.

There are various types of buffers including, but not limited to, circular buffers, Direct Memory Access (DMA) buffers, and Input/Output (IO) buffers. Circular buffers are often used in embedded systems for their efficiency in situations where data is produced and consumed at different rates. Circular buffers are particularly useful in serial communication and streaming data applications. DMA buffers are used when data needs to be transferred between peripherals and memory without continuous processor intervention, improving system performance. IO buffers are used to balance the data flow between the system's core logic and its input/output interfaces, crucial for ensuring responsive and reliable system operation.

Effective buffer management is vital in embedded systems to prevent data loss, avoid buffer overflows, and ensure timely data processing. This includes techniques for determining when buffers are full or empty, managing read/write pointers, and handling buffer resets or overwrites in cases where real-time data processing is critical. Buffers within these systems are essential for managing data flow, ensuring that embedded systems can meet their real-time performance and reliability requirements.

A fundamental challenge in computing and embedded systems is efficiently determining whether a shared circular buffer is full or empty to enable parallel processing without complex, inefficient, or hardware-dependent solutions. This challenge highlights the difficulties in ensuring that a producer entity does not overwrite data in a buffer that a consumer entity has not read yet, and conversely, that the consumer entity does not read the same data more than once or attempt to read data from an empty buffer. It is a state that must be reliably determined even during context switches and when variables are updated. This challenge, often referred to as the producer-consumer problem, has persisted in computing since its early days, with various approaches attempting to resolve it, each with its limitations.

Traditional solutions have either involved locking mechanisms, which force the producer entity and the consumer entity to operate sequentially, or non-locking mechanisms that depend on specific hardware capabilities or involve data copying to maintain atomicity. In traditional systems, achieving parallel processing often means sacrificing a buffer slot to clearly demarcate the full or empty states of the buffer, which may not always be feasible, especially with large buffers.

In the locking mechanisms, mutual exclusion is used to prevent multiple threads from accessing a shared resource (e.g., buffer) at the same time. While effective in preventing data corruption, mutual exclusion can lead to deadlocks, where two processes are each waiting for the other to release a lock. Further, semaphores are used to allow a certain number of threads to access a resource concurrently. However, semaphores still introduce overhead and complexity, can lead to priority inversion, and are susceptible to issues like semaphore leakage, where a thread fails to release a semaphore, leading to blockages.

A few traditional solutions were implemented using critical sections, i.e., parts of the code that must not be executed by more than one thread or process at the same time. Managing access to critical sections requires careful design to avoid deadlocks and ensure that no thread is starved of resources. This management often involves complex algorithms and significant overhead, especially in systems with many concurrent threads.

Some traditional solutions use busy waiting or polling mechanisms to check the status of the buffer continuously. This approach is resource-intensive and inefficient since it involves repeatedly executing a loop until the condition changes, consuming valuable processor time that could be used for other tasks. Busy waiting is often due to mutual exclusion in the critical section.

Single-threaded approaches simplify buffer management by avoiding concurrent access issues but at the cost of parallelism, significantly reducing system throughput. Blocking solutions, where the producer entity or the consumer entity waits until an item is removed or added, respectively, can lead to deadlocks, priority inversion, underutilization of system resources, and increased latency.

In view of the above, problems with traditional solutions include resource efficiency, complexity, real-time performance, and scalability. Many traditional solutions require additional resources, such as memory for semaphore variables or Central Processing Unit (CPU) cycles for busy waiting, which could be prohibitive in resource-constrained embedded systems. Implementing and maintaining solutions involving locks, semaphores, or critical sections can significantly increase the complexity of embedded software, making it harder to debug and verify. Ensuring real-time performance with traditional solutions can be challenging, especially in systems with strict timing constraints. Overhead introduced by synchronization mechanisms can lead to missed deadlines. As the number of concurrent threads increases, managing access to shared resources becomes more complex and error-prone, impacting the scalability of traditional solutions.

Therefore, based on the above, there exists a technological need for an improved, efficient, and reliable computer-implemented system and method for data synchronization, especially for circular buffers.

SUMMARY

In an aspect, the present disclosure relates to a system for data synchronization, including a processor, and a memory operatively coupled to the processor, the memory including processor-executable instructions which, when executed, cause the processor to determine a position of an in-pointer associated with a producer entity and an out-pointer associated with a consumer entity. Each in-pointer and the out-pointer is associated with a respective slot within a buffer, and the position of each pointer indicates a status of the buffer. Further, the processor is configured to record a producer lap indicator and a consumer lap indicator associated with the producer entity and consumer entity, respectively, in a first set of slots associated with the buffer. Further, the processor is configured to determine a modulated lap value of each producer and consumer lap indicator. The modulated lap value is determined at least on the in-pointer and the out-pointer associated with the corresponding producer entity and consumer entity traverse along each slot in the buffer, the modulated lap value being stored in a producer paperclip indicator and the consumer paperclip indicator are recorded in a second set of slots associated with the buffer. Further, the processor is configured to detect a race condition based at least on the in-pointer and the out-pointer being referenced to a single slot within the buffer and compare the producer paperclip indicator and the consumer paperclip indicator at the single slot. Furthermore, the processor is configured to determine a sequence to access the buffer upon addressing the race condition.

In an embodiment, a computer-implemented method is disclosed. The computer-implemented method performed by a processor includes determining a position of an in-pointer associated with a producer entity and an out-pointer associated with a consumer entity. Each in-pointer and out-pointer is associated with a respective slot a buffer. The position of each of the in-pointer and the out-pointer indicates a status of the buffer. Further, the method includes recording a producer lap indicator and a consumer lap indicator associated with the producer entity and consumer entity, respectively, in a first set of slots associated with the buffer. Further, the method includes determining a modulated lap value of each producer and the consumer lap indicator. The modulated lap value is determined at least on the in-pointer and the out-pointer associated the corresponding producer entity and consumer entity traverse along each slot in the buffer, the modulated lap value being stored in a producer paperclip indicator and a consumer paperclip indicator, respectively. The producer paperclip indicator and the consumer paperclip indicator are recorded in a second set of slots associated with the buffer. Further, the method includes detecting a race condition based at least on the in-pointer and the out-pointer being referenced to a single slot within the buffer, and comparing the producer paperclip indicator and the consumer paperclip indicator at the single slot. Furthermore, the method includes determining a sequence to access the buffer upon addressing the race condition.

In another aspect, the present disclosure relates to a non-transitory computer readable medium comprising executable instructions that cause a processor to determine a position of an in-pointer associated with a producer entity and an out-pointer associated with a consumer entity. Each in-pointer and the out-pointer is associated with a respective slot within a buffer, and the position of each pointer indicates a status of the buffer. Further, the processor records a producer lap indicator and a consumer lap indicator associated with the producer entity and consumer entity, respectively, in a first set of slots associated with the buffer. Further, the processor determines a modulated lap value of each producer and the consumer lap indicator. The modulated lap value is determined at least on the in-pointer and the out-pointer associated with the corresponding producer entity and consumer entity traverse along each slot in the buffer, the modulated lap value being stored in a producer paperclip indicator and the consumer paperclip indicator are recorded in a second set of slots associated with the buffer. Further, the processor detects a race condition based at least on the in-pointer and the out-pointer being referenced to a single slot within the buffer, and compares the producer paperclip indicator and the consumer paperclip indicator at the single slot. Furthermore, the processor determines a sequence to access the buffer upon addressing the race condition.

BRIEF DESCRIPTION OF THE FIGURES

The following detailed description of illustrative embodiments is better understood when read in conjunction with the appended drawings. To illustrate the present disclosure, exemplary constructions of the disclosure are shown in the drawings. However, the present disclosure is not limited to a specific device, or a tool and instrumentalities disclosed herein. Moreover, those in the art will understand that the drawings are not to scale.

FIG. 7 illustrates a flow diagram of an exemplary computer-implemented method for data synchronization using lapping with a paperclip (LWAP), in accordance with embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted to not unnecessarily obscuring the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Various examples of the present disclosure provide computer-implemented systems and methods for facilitating data synchronization.

Various embodiments of the present invention are described hereinafter with reference to FIG. 1 to FIG. 7.

Figure 1:
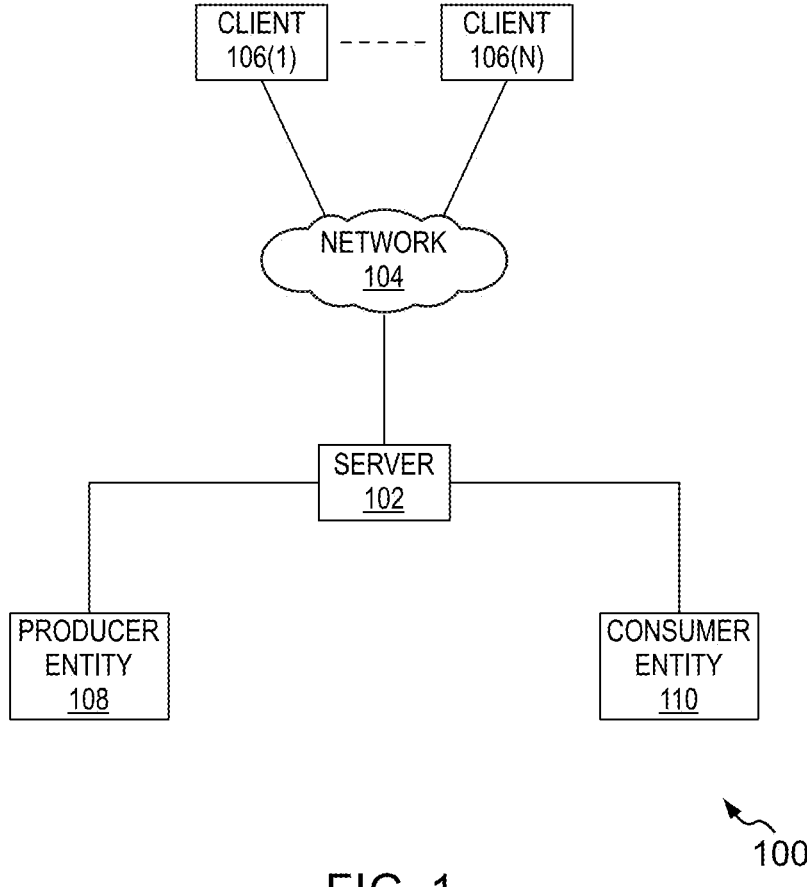
FIG. 1 illustrates an example representation of a network architecture, in accordance with embodiments of the present disclosure.

FIG. 1 illustrates an example representation of a network architecture 100, in accordance with embodiments of the present disclosure. Although the network architecture 100 is presented in one arrangement, other embodiments may include the parts of the network architecture 100 (or other parts) arranged otherwise depending on, for example, for facilitating data synchronization.

The network architecture 100 generally includes a server 102 (interchangeably referred as the "system 102") and one or more clients (106(1) . . . 106(N)). It should be noted that for ease of reference, the one or more clients (106(1) . . . 106(N)) may be collectively referred to as the clients 106 and individually referred to as the client 106. The clients 106 and the server 102 are coupled to, and in communication with (and/or with access to) a network 104. In some embodiments, each client 106 sends requests to and receives responses from the server 102 via the network 104. In some embodiments, the clients 106 may generate data and/or consume data.

In some embodiments, the network 104may include, without limitation, a Light Fidelity (Li-Fi) network, a Local Area Network (LAN), a Wide Area Network (WAN), a metropolitan area network (MAN), a satellite network, the Internet, a fiber-optic network, a coaxial cable network, an Infrared (IR) network, a Radio Frequency (RF) network, a virtual network, and/or another suitable public and/or private network capable of supporting communication among the entities illustrated in FIG. 1, or any combination thereof.

Various entities in the network architecture 100 may connect to the network 104 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. For example, the network 104 may include multiple different networks, such as a private network made accessible by the clients 106, and a public network (e.g., Internet) through which the clients 106 and the server 102 may communicate.

Referring to FIG. 1, the server 102 may act as a central hub that processes requests from the clients 106 and facilitates data exchange between a producer entity 108 and a consumer entity 110. In accordance with embodiments of the present disclosure, the server 102 may synchronize data exchange efficiently, ensuring that a buffer managed by the server 102 is accurately and efficiently utilized. A person of ordinary skill in the art will understand that a buffer may refer to a region of physical memory storage used to temporarily store data while it is being moved from one place to another. In some embodiments, the server 102 may be deployed as a standalone server or can be implemented in the cloud as Software as a Service (SaaS). The server 102 is embodied in at least one computing device in communication with the network 104 and/or embodied in at least one non-transitory computer-readable media.

The producer-consumer problem exists around a circular buffer, because the state of the buffer, whether full or empty, needs to be known. The state of the buffer must be preserved during context switches, and when variables are updated. Traditionally, the solutions to accomplish this have been locking mechanisms that require the producer entity 108 and the consumer entity 110 to operate one at a time, and non-locking mechanisms that require the use of hardware or copying to maintain atomicity.

Lapping includes that if two runners are side by side, then either they are tied or one is ahead of the other. On a buffer that equates to empty or full, if the runners are not side by side, then there is catching up to do, or out lapping the other runner; this means producing and consuming on demand without waiting one at a time for one another. Laps are represented by 0 or 1. The buffer is empty if both the producer entity 108 and the consumer entity 110 are on the same lap as at the start, and full if they are not on the same lap as in the producer entity 108 out laps the consumer entity 110. The producer entity 108 cannot produce on a full buffer and the consumer entity 110 cannot consume on an empty buffer; if the buffer is not full or empty, only one other state exists, i.e., parallel processing. Both the producer entity 108 and the consumer entity 110 indicate the completion of a transaction by moving to the next buffer slot and checking for one another before beginning a transaction at each slot to see if the buffer is full or empty. The only problem with this is when the laps change at the finish line; if the producer entity 108 and the consumer entity 110 are both at the last slot of the buffer before returning to slot 0, then their laps can be what they are before they get to slot 0 and what they will be at slot 0, while they are side by side at the slot just before slot 0. This yields two contradictory results of full and empty after the initial determination, because the consumer entity 110 or the producer entity 108 must update the lap before advancing from their present location, which will be described in detail throughout the disclosure.

The producer entity 108 may refer to a process, task, or component responsible for generating data or output. For example, the data may be anything from sensor readings in an Internet of Things (IoT) device to frames of video in a streaming application. The data will be stored in the buffer before being sent across the network 104 to the clients 106 or other systems. The role of the producer entity 108 is to ensure a steady and reliable supply of data to the shared buffer, from which the consumer entity 110 can retrieve the data for further processing or use. In accordance with embodiments of the present disclosure, the producer entity 108 does not need to wait for the consumer entity 110 to catch up before producing more data, as long as buffer space is available. This helps in reducing idle time and increases the system's responsiveness. In some embodiments, the producer entity 108 may use lapping to mark its progress in the buffer, which will be discussed in detail throughout the disclosure. In some other embodiments, when the buffer is full and the consumer entity 110 is slow, the producer entity 108 may leverage the functionality of reset to overwrite the old data with new, more relevant data, ensuring that the system always has the most up-to-date information.

The consumer entity 110 may refer to a process, task, or component responsible for consuming the data from the buffer, i.e., retrieving and processing the data generated by the producer entity 108. The consumer entity 110 reads and removes the data from the buffer for processing, for example, for displaying it to a user (or client 106), storing it for long-term use, or using it as input for further computational tasks. The consumption of data must often keep pace with the rate of production to prevent buffer underflow, where the consumer entity 110 runs out of data to process. The consumer entity 110 may need to determine whether there is data to consume. In accordance with lapping and paperclipping, the consumer entity 110 may determine if the buffer is empty or full without causing delays. It may be appreciated that the consumer entity 110 can operate in parallel with the producer entity 108, i.e., as soon as the consumer entity 110 finishes processing data from one part of the buffer, it can immediately move on to the next, thereby improving throughput. In situations where the buffer is overwritten by the producer entity 108, the consumer entity 110 can reset and start processing the latest data.

Therefore, in accordance with embodiments of the present disclosure, the server's management of the buffer is more efficient, avoiding common problems associated with traditional solutions such as deadlocks, priority inversion, and reliability on hardware-specific features. The producer entity 108 and the consumer entity 110 may work independently and in parallel, with the server 102 acting as an intermediary that ensures synchronization and proper data flow. It may be appreciated that lapping allows the server 102 to maximize buffer utilization by allowing the producer entity 108 to continue producing as long as there is space in the buffer and enabling the consumer entity 110 to consume as long as data is available. Lapping may revolutionize the use of bounded buffers in computing systems. Further, paperclipping helps resolve any ambiguity about the state of the buffer, especially at critical transaction points, ensuring data consistency and reliability.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device is shown in FIG. 1 may be implemented as multiple, distributed systems or devices. Additionally, or alternatively, a set of systems (e.g., one or more systems) or a set of devices (e.g., one or more devices) of the network architecture 100 may perform one or more functions described as being performed by another set of systems or another set of devices of the network architecture 100.

Figure 2:
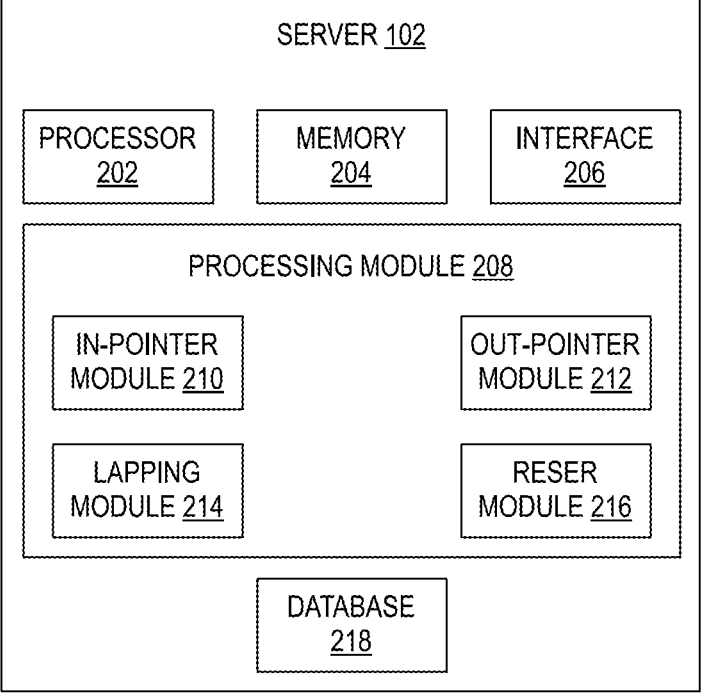
FIG. 2 is a simplified block diagram of a server for facilitating data synchronization, in accordance with embodiments of the present disclosure.

FIG. 2 is a simplified block diagram 200 of a server such as the server 102 for facilitating data synchronization, in accordance with embodiments of the present disclosure.

In some embodiments, and as shown in FIG. 2, the server 102 may include one or more processors 202. The one or more processors 202 may be implemented as one or more microprocessors, microcomputers, microcontrollers, digital signal processors, central processing units, logic circuitries, and/or any devices that manipulate data based on operational instructions. Among other capabilities, the one or more processors 202 may be configured to fetch and execute computer-readable instructions stored in a memory 204 of the server 102. The memory 204 may store one or more computer-readable instructions or routines, which may be fetched and executed to create or share the data units over a network service. The memory 204 may include any non-transitory storage device including, for example, volatile memory such as Random-Access Memory (RAM), or non-volatile memory such as an Erasable Programmable Read-Only Memory (EPROM), a flash memory, and the like.

In some embodiments, the server 102 may also include an interface(s) 206. The interface(s) 206 may include a variety of interfaces, for example, interfaces for data input and output devices, referred to as I/O devices, storage devices, and the like. The interface(s) 206 may facilitate communication of the server 102 with various devices coupled to it. The interface(s) 206 may also provide a communication pathway for one or more components of the server 102. Examples of such components include, but are not limited to, processing module(s) 208 and a database 218.

In some embodiments, the processing module(s) 208 may be implemented as a combination of hardware and programming (for example, programmable instructions) to implement one or more functionalities of the processing module(s) 208. In examples, described herein, such combinations of hardware and programming may be implemented in several different ways. For example, the programming for the processing module(s) 208 may be processor-executable instructions stored on a non-transitory machine-readable storage medium and the hardware for the one or more processors 202 may include a processing resource (for example, one or more processors), to execute such instructions. In the present examples, the machine-readable storage medium may store instructions that, when executed by the processing resource, implement the processing module(s) 208. In such examples, the server 102 may include the machine-readable storage medium storing the instructions and the processing resource to execute the instructions, or the machine-readable storage medium may be separate but accessible to the server 102 and the processing resource. In other examples, the processing module(s) 208 may be implemented by an electronic circuitry.

In some embodiments, the database 218 may include data that may be either stored or generated as a result of functionalities implemented by any of the components of the processors 202 or the processing module(s) 208 or the server 102.

It is noted that the server 102 as illustrated and hereinafter described is merely illustrative of an apparatus that could benefit from embodiments of the present disclosure, and therefore, should not be taken to limit the scope of the present disclosure. It is noted that the server 102 may include fewer or more components than those depicted in FIG. 2.

In an exemplary embodiment, the processing module(s) 208 may include one or more modules selected from any of an in-pointer module 210 corresponding to the producer entity (e.g., 108 of FIG. 1), an out-pointer module 212 corresponding to the consumer entity (e.g., 110 of FIG. 1), a lapping module 214 (also including paperclipping module and interchangeably referred to as 'paperclipping module 214'), a reset module 216, and other modules. The other modules may include, but are not limited to, a monitoring module, a determination module, a notification module, and the like. It may be appreciated that lapping and paperclipping modules are represented as one module for case of reference.

In some embodiments, the server 102 represents the central system that handles synchronization of I/O operations between the producer entity 108 and the consumer entity 110 using, for example, a circular buffer. The in-pointer module 210 may determine and/or store information corresponding to an in-pointer, indicating a position within the circular buffer where the producer entity 108 is currently writing data, ensuring that data is placed correctly without overwriting unconsumed data. The in-pointer module 210 integrates with the lapping module 214 to ensure that the in-pointer's movement around the buffer is accurately reflected in the lapping count. The out-pointer module 212 may determine and/or store information corresponding to an out-pointer, indicating a position within the circular buffer where the consumer entity 110 is reading data. The out-pointer module 212 integrates with the paperclipping module (also 214) to resolve any potential ambiguities when the pointers are at the same location, ensuring reliable data consumption.

In some embodiments, the lapping module 214 may initiate a lapping operation and/or a paperclipping operation. For example, the lapping module 214 may initiate the lapping operation to track the laps of the in-pointer associated with the in-pointer module 210 and the out-pointer associated with the out-pointer module 212 around the circular buffer to determine when the buffer is full or empty without requiring locks. The lapping module 214 may determine a producer lap indicator associated with the producer entity 108 and a consumer lap indicator associated with the consumer entity 110. A lap is considered to be completed when a pointer returns to its starting point after traversing the entire buffer. The functions of the lapping operation may include, but are not limited to, pointer tracking, buffer state determination, synchronization without locks, facilitating parallel processing, and wait-free operations.

In some embodiments, the lapping module 214 may monitor the in-pointer module 210 and the out-pointer module 212, i.e., the positions of the in-pointer and the out pointer within the circular buffer, thereby effectively tracking how many times each pointer has lapped the buffer. Utilizing the count of the laps, the lapping module 214 may determine the state of the buffer, for example, full, empty, or partially filled. This is crucial for enabling the producer entity 108 to determine when it can safely write data to the buffer and for the consumer entity 110 to determine when it can read the data from the buffer without any data loss or collision.

By keeping track of the laps, the lapping module 214 may allow the system (or the server 102) to synchronize the actions of the producer entity 108 and the consumer entity 110. This is especially advantageous in real-time systems where lock contention may lead to unacceptable delays. The lapping operation allows the producer entity 108 and the consumer entity 110 to process in parallel, improving the overall throughput of the system. The lapping module 214 coordinates these parallel operations to maintain system integrity. Since the lapping module 214 can provide immediate information about the state of the buffer, both the producer entity 108 and the consumer entity 110 can operate in a wait-free manner. For example, the producer entity 108 does not need to wait for the consumer entity 110 to catch up, and vice versa, as long as the buffer is not full or empty, respectively.

In some embodiments, the lapping/paperclipping module 214 may initiate the paperclipping operation particularly when the in-pointer of the producer entity 108 and the out pointer of the consumer entity 110 are at the point of transitioning across the end of the buffer. This is crucial for ensuring the integrity of the state of the buffer. The functions of the paperclipping operation may include, but are not limited to, state recording, buffer integrity, and transaction validation.

In some embodiments, the paperclipping module 214 may record the state of the buffer just before the pointers wrap around the buffer, effectively paperclipping the state to reference when there is potential ambiguity. When either the producer entity 108 or the consumer entity 110 reaches the penultimate position in the buffer (i.e., one slot before warping around to the start), the paperclipping module 214 records the current lap of that entity. If the in pointer and the out-pointer meet at the wrap-around point (e.g., the last slot of the buffer), the paperclipping module 214 uses the recorded lap, i.e., producer lap indicator and/or consumer lap indicator, to determine the correct state of the buffer, i.e., whether the buffer is actually full or empty. In a scenario where both the producer entity 108 and the consumer entity 110 simultaneously reach the wrap-around point, the paperclipping module 214 uses the recorded states to ensure that each entity, i.e., the producer entity 108 and the consumer entity 110 correctly interprets the state of the buffer and acts accordingly. By keeping track of the last known state, the paperclipping module 214 ensures the integrity of the buffer even when the in pointer and the out-pointer are at the same location. In some embodiments, before any read or write operation is performed by the consumer entity 110 or the producer entity 108, respectively, the paperclipping module 214 may check the recorded state to validate whether the operation can proceed, ensuring that the producer entity 108 does not write to a full buffer and the consumer entity 110 does not read from an empty buffer.

In some embodiments, the reset module 216 may initiate a reset operation, allowing the producer entity 108 to overwrite old data with new data when the buffer is full and the consumer entity 110 is slow. When the buffer is full, the producer entity 108 may activate a flag signalling that no more data can be produced until the consumer entity 110 has caught up. The reset module 216 may initiate a four-way handshake between the producer entity 108 and the consumer entity 110. The producer entity 108 sets the flag (e.g., to 1) indicating the buffer is full. The consumer entity 110 acknowledges and resets its read position, and then the producer entity 108 resets its write operation. This is crucial for maintaining a continuous flow of data, especially in real-time systems.

It should be noted that components, described herein, can be configured in a variety of ways, including electronic circuitries, digital arithmetic and logic blocks, and memory systems in combination with software, firmware, and embedded technologies, etc., if bounded buffers are used in a consumer-producer paradigm.

Figure 3A:
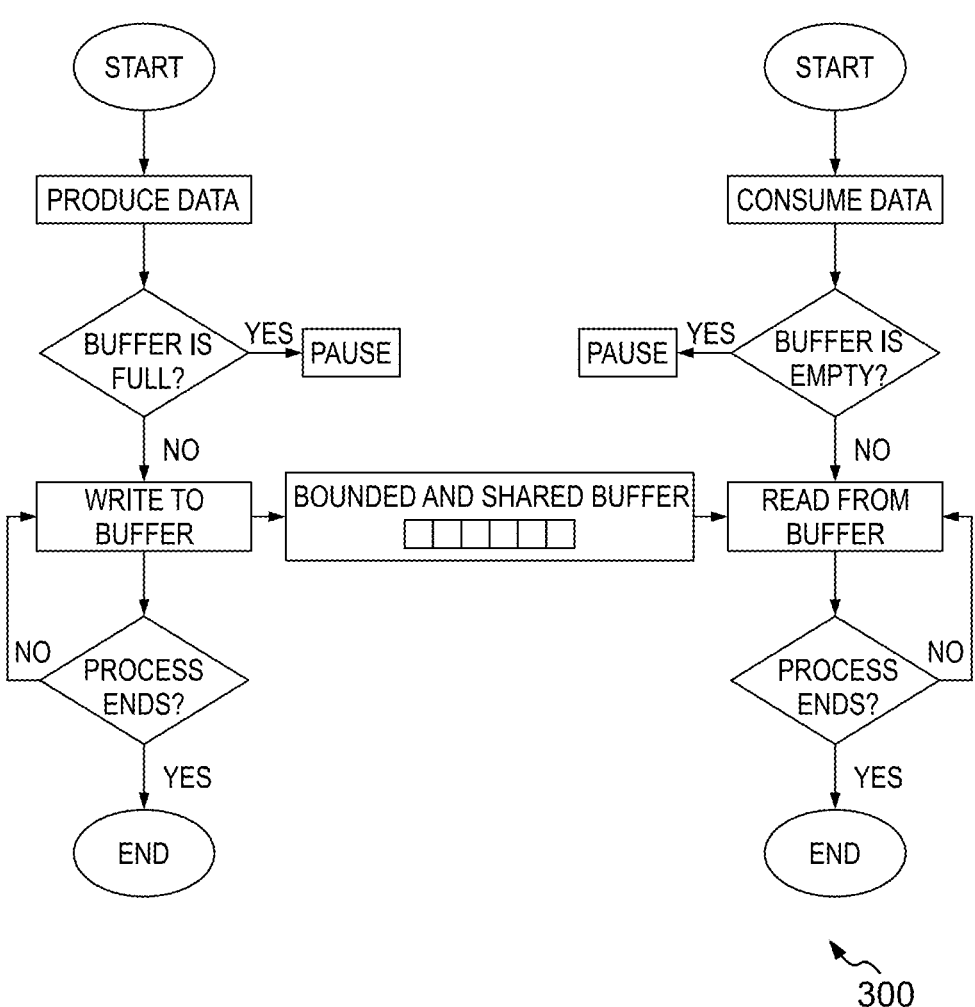
FIG. 3A illustrates a flow chart of an example method for multiple buffer lapping, in accordance with embodiments of the present disclosure.

FIG. 3A illustrates a flow chart of an example method 300 for multiple buffer lapping, in accordance with embodiments of the present disclosure. It may be appreciated that the flowchart depicts both the producer entity side and the consumer entity side for the management of abounded shared buffer.

At the start, the buffer is empty, both the consumer entity (e.g., 110 of FIG. 1) and the producer entity (e.g., 108 of FIG. 1) are at the first buffer slot (0), and the producer entity 108 must start first so that there is something to consume by the consumer entity 110. The producer entity 108 produces data in the first buffer slot and moves to the second buffer slot to indicate that an item is in the buffer. The consumer entity 110 can consume data from slot 0 and the producer entity 108 can produce data at slot 1. This is always the case when in-pointer does not equal out-pointer anywhere around the buffer. For parallel or simultaneous processing, there exists both an empty slot and a full slot at all times. As an example, the flow chart shows a buffer of size six. The current pointer position will be as shown below:

i
    [x][ ] . . .
    o

Logically, the buffer is circular, i.e., slot 0 connects to slot 5. Data can be both produced and consumed if in-pointer (i) does not equal out-pointer (o). When the in-pointer is equal to the out-pointer at any slot around the buffer, the buffer is either full or empty. The pointer position will be as shown below:

i
    Full [x][x][x][x][x][x] or Empty [ ][ ][ ][ ][ ][ ]
    o

The producer and consumer lap indicators are updated when either of their pointers (in or out) are crossing over from slot 5 back to slot 0. Lap indicators are numbered either 0 or 1. When the consumer and producer lap indicators are equal, the buffer is empty, and when they are not equal, the buffer is full. If the buffer is full, the producer entity 108 pauses, and if the buffer is empty, the consumer entity 110 pauses. This process of knowing when the buffer is full or empty works fine until both pointers are equal at slot 5. This is the location where the lap indicators change from their value at slot 5 to what they will be at slot 0; all while the pointers are equal at the same location. The pointer position is as shown below:

01
    [ ][ ]
    i=0 5 [ ][ ]2
    [ ][ ]
    4 3

Both lap indicators are initially 0, and the in-pointer and out-pointer are at slot 5 (i.e., the buffer is empty). If the producer entity 108 decides to add an item, then its lap indicator, i.e., producer lap indicator changes to 1, and now the buffer appears to be full to the consumer entity 110 (since lap indicators are not equal). The pointer position is as shown below:

5 0
    i
    [x][ ]
    o

In a transaction, the producer entity 108 adds an item, updates the producer lap indicator (only at slot 5), and then moves the in-pointer to the next slot (transaction complete). The consumer entity 110 periodically checks if the buffer is full or empty and sees the producer lap indicator change while the in-pointer equals the out-pointer, consumes the item in the buffer, and moves to slot 0 while the producer entity 108 is still completing the transaction.

The pointer position is as shown below:

450
    i [ ][ ][
    ]o

In the results above, the in-pointer does not equal the out-pointer, and the consumer entity 110 can try to consume data from an empty buffer slot 0. This can also happen the other way around where the producer entity 108 tries to produce data into a full buffer slot 0.

The pointer position is as shown below:

450 i
    [x][x][x]
    o

To mitigate this synchronization issue, the paperclipping module (e.g., the lapping module 214 of FIG. 2) may initiate the paperclipping operation. Paperclipping is where the laps (i.e., paperclip indicators) are recorded at the slot before the lap change occurs (e.g., slot 4 above). The paperclip lap indicators may be recorded at any slot prior to the slot where the lap change occurs. The paperclip lap indicators, i.e. producer paperclip indicator and the consumer paperclip indicator, are used for comparison when the in-pointer equals the out-pointer at, for example, slot five. The producer entity 108 (i.e., in-pointer) and the consumer entity 110 (i.e., out-pointer) can complete their transactions safely with an appropriate pause when the buffer is full or empty at slot five (slot before a lap is completed around the buffer).

Referring to FIG. 3, at the producer entity side, the production process begins. The producer entity (e.g., 108 of FIG. 1) creates or generates data that needs to be passed to the consumer entity (e.g., 110 of FIG. 1). The data may include, for example, sensor readings, computational results, user-generated content, or the like. Further, the system (or the server 102) checks if the buffer is full. This check is made using the lapping module (e.g., 214 of FIG. 2) where the producer entity's lap, i.e. position of the in-pointer (determined via the in-pointer module 210) is compared against the consumer entity's lap, i.e. position of the out-pointer (determined via the out-pointer 212) to determine the buffer's occupancy.

In some embodiments, if the buffer is full, the producer entity 108 must pause until an item is removed for a predetermined duration of time, for example, until the buffer is no longer full or the consumer entity 110 removes an item from the buffer. During this state, the producer entity 108 does not write new data to the buffer. This prevents the buffer from being overwritten with new data before the consumer entity 110 has processed the existing data. In some other embodiments, if the buffer is not full, the producer entity 108 may continue to the next step, i.e., the producer entity 108 writes the generated data to the buffer. The producer entity 108 writes the data to the buffer in its current in-pointer position, and the in-pointer is updated.

The server 102 checks if the data production is complete or if more data is expected. If the data production is complete, the production process ends. If the data production is not complete, it loops back to complete the data production.

At the consumer entity side, the consumption process begins. The consumer entity processes the data from the buffer. Further, the server 102 checks if the buffer is empty. This check is made using the lapping module (e.g., 214 of FIG. 2) where the producer entity's lap, i.e. position of the in-pointer (determined via the in-pointer module 210) is compared against the consumer entity's lap, i.e. position of the out-pointer (determined via the out-pointer 212) to determine the buffer's occupancy when in-pointer equals out-pointer.

In some embodiments, if the buffer is empty, the consumer entity 110 must pause for a predetermined duration of time, for example, until the buffer is no longer empty or the producer entity 108 adds an item to the buffer. During this state, the consumer entity 110 does not read data from the buffer. This prevents the consumer entity 110 from reading unpopulated slots of the buffer. In some other embodiments, if the buffer is not empty, the consumer entity 110 may continue to the next step, i.e., the consumer entity 110 reads the data from the buffer. The consumer entity 110 reads the data from the buffer at its current out-pointer position, and the out-pointer is updated.

The server 102 checks if the data consumption is complete or if more data is expected to be consumed. If the data consumption is complete, the consumption process ends. If the data consumption is not complete, it loops back to complete the consumption process.

The producer-consumer problem of determining an empty versus a full buffer has yielded many complicated, inefficient, and resource intensive solutions. The circular buffer is full or empty when the producer entity 108 out-laps the consumer entity 110 or the consumer entity 110 catches up to the producer entity 108, respectively. The original lap is recorded at (buffer size-2) for comparison (e.g., paperclip lap indicators); due to the lap change at (buffer size-1). In some embodiments, if the pointers move before the lap change, then the paperclip indicator may be read at slot 0 instead of buffersize-1, because that would then be where the lap change takes place.

Therefore, using multiple buffer lapping and paperclipping, the bounded and shared buffer allows the producer entity 108 to write data and the consumer entity 110 to read data in a synchronized manner, ensuring data integrity and process efficiency. The lapping operation allows the producer-consumer operations to happen concurrently and without requiring locks, thus enhancing performance, especially in systems that require real-time processing or have high data throughput demands. The method 300 presents a simplified view of these operations, abstracting the underlying complexity of the lapping logic, which carefully manages the pointers' positions to maintain the buffer's state.

Figure 3B:
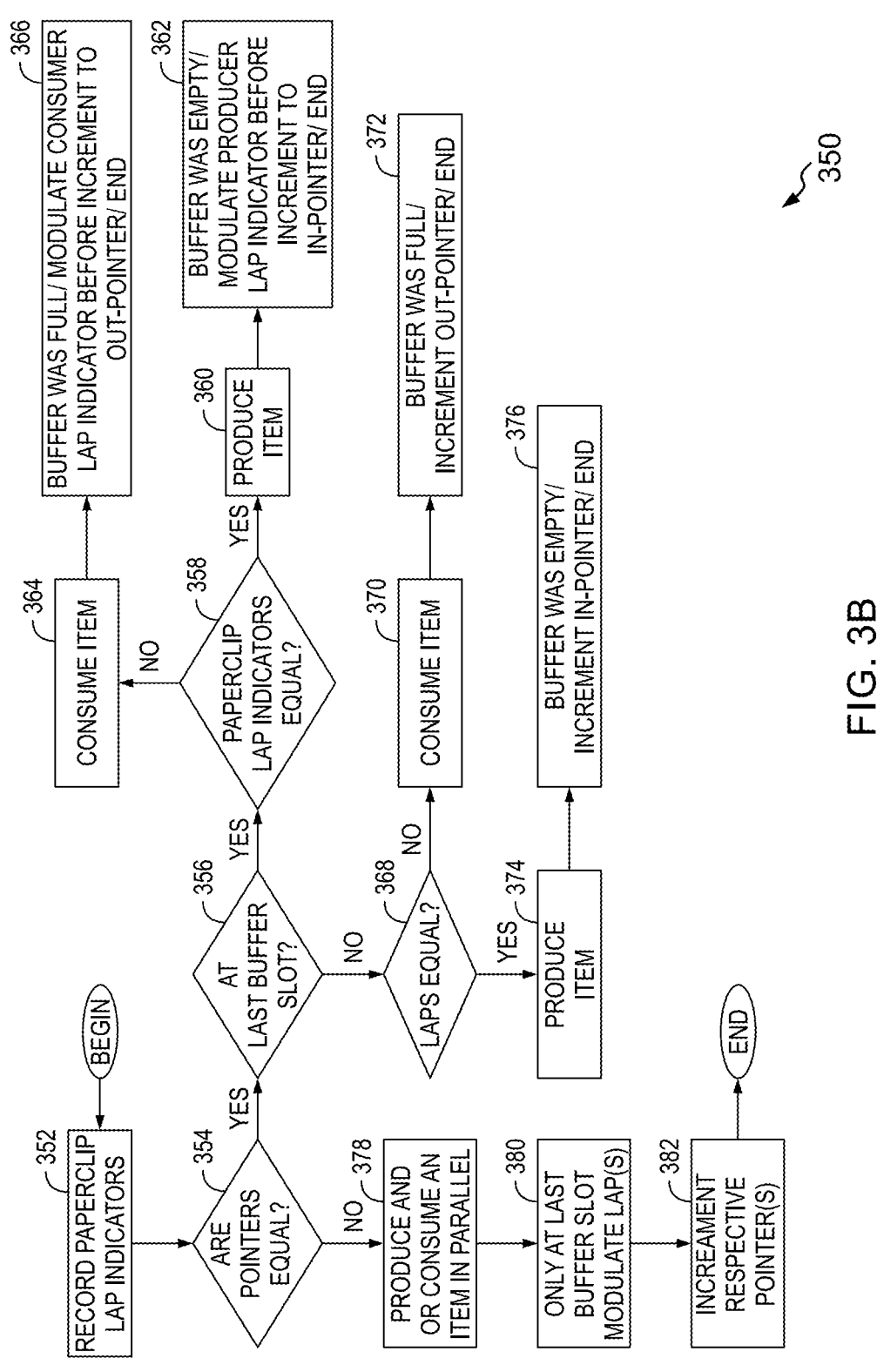
FIG. 3B illustrates a flow chart of an example method for data synchronization using lapping with a paperclip (LWAP) logic in a bounded multiple-slot circular buffer, in accordance with embodiments of the present disclosure.

FIG. 3B illustrates a flow chart of an example method 350 for data synchronization using lapping with a paperclip (LWAP) logic in a bounded multiple-slot circular buffer, in accordance with embodiments of the present disclosure.

The method 350 starts at step 352, where the server 102 (as shown in FIG. 2) records the paperclip lap indicators such as the producer paperclip indicator and the consumer paperclip indicator prior to a change in the respective producer lap indicator and the consumer lap indicator associated with the producer entity 108 (as shown in FIG. 1) and the consumer entity 110 (as shown in FIG. 1), and determine the state of the buffer based on the producer paperclip indicator and the consumer paperclip indicator.

At step 354, the server 102 checks whether the in-pointer and out-pointer are equal. If the pointers are equal (e.g., in-pointer and out-pointer are at the same slot in the buffer), the server 102 proceeds to check whether it is at the last buffer slot or not at step 356. If the condition is true (e.g., in-pointer and out-pointer are equal at the last slot of the buffer), the server 102 proceeds to check whether the producer paperclip indicator and the consumer paperclip indicator are equal at the last buffer stop at step 358. If the producer paperclip indicator and the consumer paperclip indicator are equal, the server 102 assumes that the buffer was empty. Therefore, the server 102 modulates the producer lap indicator (e.g., inLap) before incrementing the in-pointer, signifying that an item can be produced in the buffer at step 360. If the producer and consumer paperclip indicators are not equal, the server 102 assumes the buffer was full. Hence, the server 102 modulates the consumer lap indicator (e.g., OutLap) before incrementing the out-pointer to consume an item from the buffer at step 362.

If the in-pointer and out-pointer are equal but not at the last buffer slot, the server 102 checks whether the producer lap indicator and consumer lap indicator are equal or not at step 364. If the laps are not equal, the server 102 assumes the buffer is full, and the consumer entity 110 consumes an item by incrementing the out-pointer at step 366. If the producer and consumer lap indicators (such as laps) are equal, the server 102 assumes the buffer is empty, and the producer entity 108 produces an item by incrementing the in-pointer at step 368.

If the in-pointer and out-pointer are not equal, then the producer entity 108 and the consumer entity 110 can operate in parallel. At this stage, the server 102 checks at the last buffer slot, where the server 102 modulates the respective lap indicators before incrementing the in-pointer and out-pointer at step 370. Finally, the method ends at step 372.

Figure 4:
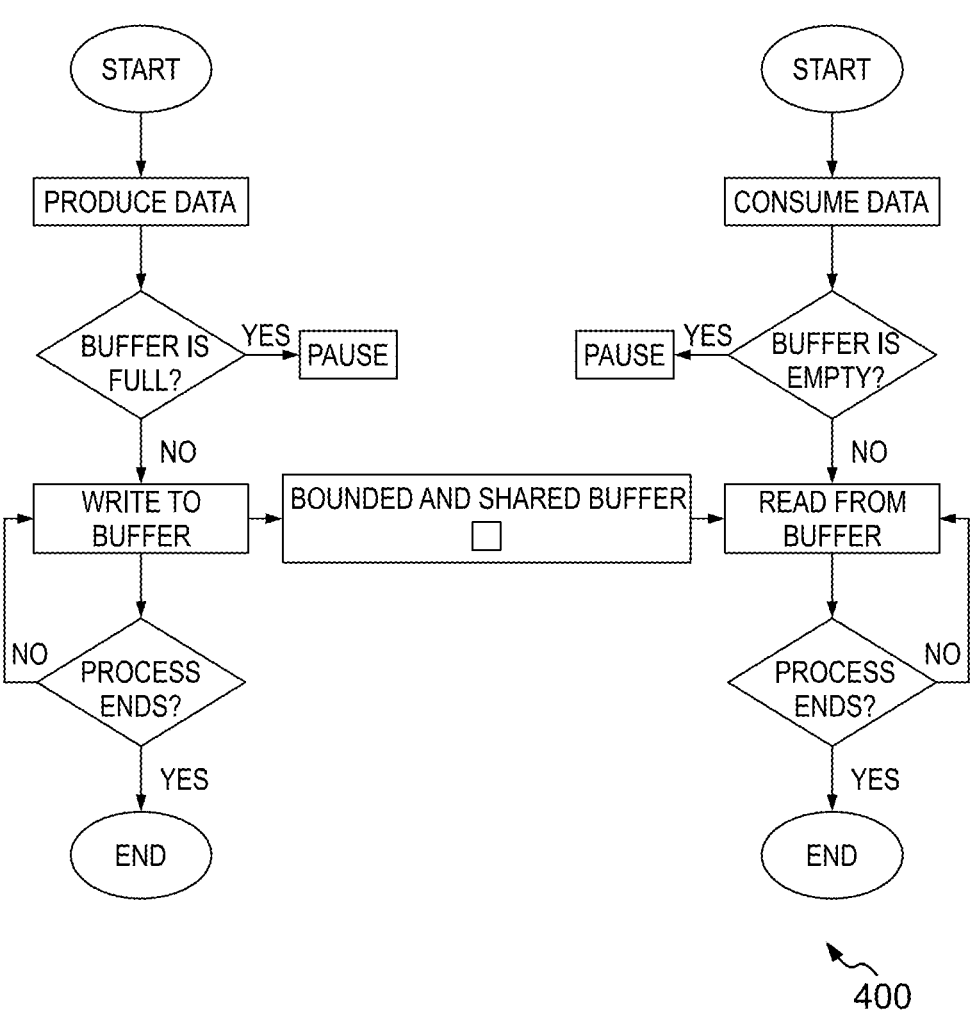
FIG. 4 illustrates a flow chart of an example method for single buffer lapping, in accordance with embodiments of the present disclosure.

FIG. 4 illustrates a flow chart of an example method 400 for single buffer lapping, in accordance with embodiments of the present disclosure. It may be appreciated that the flow chart depicts both the producer entity side and the consumer entity side for management of one shared buffer slot.

A single buffer does not have pointers, i.e. in-pointer or out-pointer, because there is only one slot. This is shown below.

[ ] single buffer slot (slot 0)

Initially, both the consumer and producer lap indicators are set to 0. The laps can only be either 0 or 1. When the lap indicators are equal, the buffer is empty and when they are not equal, the buffer is full. When the producer entity 108 adds an item, its lap indicator is updated as shown below.

[x] Producer lap equals 1. Consumer lap still 0. Buffer full pause

When the consumer entity 110 removes an item, its lap indicator is updated as shown below.

[ ] Consumer lap equals 1. Producer lap still equals 1. Buffer empty pause.

[x] Producer lap equals 0. Consumer lap still 1. Buffer full pause

[ ] Consumer lap equals 0. Producer lap still equals 0. Buffer empty pause.

Referring to FIG. 4, at the producer entity side, the production process begins. The producer entity 108 creates or generates data that needs to be passed to the consumer entity 110. Further, the server 102 checks if the buffer is full.

In some embodiments, if the buffer is full, the producer entity 108 must pause for a predetermined duration of time, for example, until the buffer is no longer full or the consumer entity 110 removes an item. During this state, the producer entity 108 does not write new data to the buffer. This prevents the buffer from being overwritten with new data before the consumer entity 110 has processed the existing data. In some other embodiments, if the buffer is not full, the producer entity 108 may continue to the next step, i.e., the producer entity 108 writes the generated data to the buffer.

The server 102 checks if the data production is complete or if more data is expected. If the data production is complete, the production process ends. If the data production is not complete, it loops back to complete the data production.

At the consumer entity side, the consumption process begins. The consumer entity 110 processes the data from the buffer. Further, the server 102 checks if the buffer is empty.

In some embodiments, if the buffer is empty, the consumer entity 110 must pause for a predetermined duration of time, for example, until the buffer is no longer empty or an item is added to the buffer. During this state, the consumer entity 110 does not read data from the buffer. In some other embodiments, if the buffer is not empty, the consumer entity 110 may continue to the next step, i.e., the consumer entity 110 reads the data from the buffer.

The server 102 checks if the data consumption is complete or if more data is expected to be consumed. If the data consumption is complete, the consumption process ends. If the data consumption is not complete, it loops back to complete the consumption process.

Therefore, the single buffer lapping ensures that both entities 108, 110 can work on the same buffer slot without the need for complex locking mechanisms. It facilitates synchronization by using a simple full/empty state indicator that determines whether the producer entity 108 can write to the buffer or if the consumer entity 110 can read from it. This mechanism is especially useful in systems where space is a premium, and the overhead of managing multiple buffer slots is undesirable. The single buffer lapping process is emblematic of systems that require tight control and predictable behavior from both producers and consumers of data.

Figure 5A:
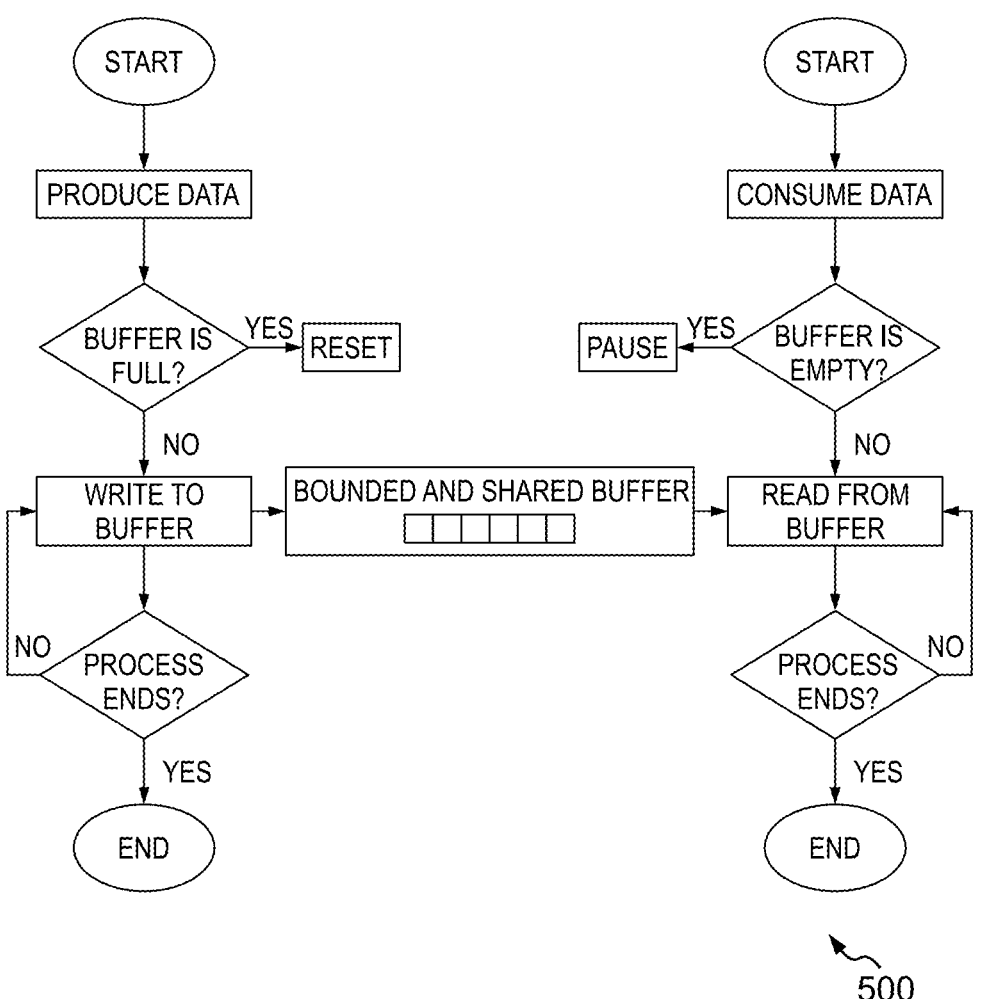
FIG. 5A illustrates a flow chart of an example method for implementing lapping reset, in accordance with embodiments of the present disclosure.

FIG. 5A illustrates a flow chart of an example method 500 for implementing lapping reset, in accordance with embodiments of the present disclosure.

The operation of lapping reset (implemented via the reset module 216 of FIG. 2) overwrites a full buffer instead of pausing when the consumer entity 110 is slow. In some scenarios, a system designer may want to overwrite old input data with more current data or they may not want to lose current data due to the buffer being already full with older data because of a slow consumer entity 110. In such scenarios, lapping reset may be initiated.

In some embodiments, when the producer entity 108 determines that the buffer is full and it cannot write, the producer entity 108 changes its flag (e.g., overPro) from 0 to 1 and pauses for consumer entity flag. The consumer entity 110 checks to see if an item is in the buffer, but identifies the producer entity flag set to 1. The consumer entity 110 pauses, resets its own lap indicator and out-pointer to 0, and then updates its flag (e.g., overCon) to 1 for the producer entity 108 to check. The producer entity 108 identifies the consumer entity flag set to 1, resets its lap indicator and in-pointer to 0, and its flag to 0, and remains paused for the consumer entity flag to be updated to 0. When the consumer entity 110 identifies the producer entity flag set to 0, it sets its flag to 0 and waits for an item to be produced. The producer entity 108 identifies the consumer entity flag set of 0 and produces data.

Therefore, the lapping reset is implemented as a four-way handshake that checks to see if both flags are 1 and finally if both flags are 0. This handshake prevents a race condition; because an item must first be produced to begin after reset/buffer empty.

Below is an example of a full and an empty buffer of size 10, where the pointers are equal at slot 9. In particular, the below example shows that the consumer entity 110 is about to consume, by updating its lap indicator to 1, but Chk paperclipping the real laps at slot 8 for a full buffer state at slot 9. The producer entity 108 would identify that the buffer is empty when looking at the lap indicators, but checks the Chk paperclip when at slot 9, which shows that the buffer is full and the consumer entity 110 is completing consumption in slot 9.

```
890 Lap Chk
1 1
[x][ ][x]
o 1 0
```

The below example shows that the producer entity 108 is about to produce by updating its lap indicator to 0, but Chk paperclipping the real laps at slot 8 for an empty buffer state at slot 9. The consumer entity 110 may identify that the buffer is full when looking at the lap indicators, but knows to check Chk paperclip when at slot 9, which shows that the buffer is empty and the producer entity 108 is completing production in slot 9.

```
i 0 1
[ ][x][ ]
o 1 1
```

Therefore, paperclipping enables to show the true lap at the last buffer slot for the consumer entity 110 and the producer entity 108 with buffer size greater than one. The single slot buffer only updates lap indicators when transactions are complete because pointers are always equal.

The below example shows the producer entity 108 updating a buffer of size two at slot zero before moving to slot one. (A) Both producer entity 108 and consumer entity 110 have completed a lap around the buffer and updated their lap indicators to 1. (B) Producer entity 108 first updates the producer paperclip indicator with the current lap, produces an item, and moves from slot 0 (buffer size-2) to slot 1 (buffer size-1). (C) The consumer entity 110 first updates the consumer paperclip indicator with the current lap, consumes an item, and moves from slot 0 (buffer size-2) to slot 1 (buffer size-1). The buffer is empty now, only the producer entity 108 can produce and move back to slot 0, in the meantime the consumer entity 110 is constantly checking for an item to consume. (D) The producer entity 108 must change laps before moving back to slot 0. If a context switch/interrupt occurs at this point in time for the producer entity 108, the consumer entity 110 decides to check if the buffer is full or empty while the producer entity 108 is away; but checks the paperclip indicators instead of the lap indicators, because the consumer and producer pointers are equal at (buffer size-1) where all lap changes take place. The paperclip indicator indicates the consumer entity 110 that the buffer is empty; because the producer entity's 108 transaction is only complete when it moves to the next buffer slot, which in this case would be back to slot 0. (E) Producer entity 108 returns from context switch and completes transaction by moving back around to slot 0. Now consumer entity 110 can consume, the producer entity 108 can produce again, and they can do it at the same time autonomously.

```
1 0 Lap Chk
i 1 0
[ ][ ]<-A
o 1 0
i 1 1
[ ][x]<-B
o 1 0
i 1 1
[ ][ ]<-C
o 1 1
i 0 1 [x][ ]
<-D o
```

1 1

I 0 1 [x][ ]

<-E o 1 1

Therefore, in accordance with embodiments of the present disclosure, the system 102 discussed herein is twice as fast as locking systems, because it consumes and produces at the same time with buffers greater than size one. There are no critical sections, because the consumer and producer entities update their own variables (no sharing). It is a thread/process safe processing chip that is hardware-independent, program language-agnostic, operating system independent, inexpensive, priority inversion/critical section free, starvation free, buffer space efficient, deadlock-free, simple to use, obstruction-free, lock-free, wait-free, works on both small and large data. Further, it may be appreciated that the system 102 may be implemented for, but not limited to, embedded systems, operating systems, and the like.

As an example, below is a pseudo code for single slot lapping. All variables initialized to zero.

```
while (1)
{/*produce    another    item    in    nextProduced*/if
    (lapPro!=lapCon)//buffer full
{continue;//continue re-iterates start of loop}
buffer[0]=nextProduced;//produce next item in buffer lap-
    Pro=(lapPro+1) % 2//update the lap producer has com-
    pleted 0 or 1} while (1) {if(lapPro==lapCon)/buffer is
    empty
{continue;}
nextConsumed=buffer[0];//consume next item in buffer
    lapCon=(lapCon+1) % 2//update the lap the consumer
    has completed 0 or 1/*consume the item in nextCon-
    sumed*/}
```

As an example, below is the pseudo code for multiple slot lapping.

```
while (1)
{/*produce    another    item    in    nextProduced*/if(in
    +2==BUF_SIZE)
{chkPro=lapPro;//mark lap two slots from start/finish for
    BUF_SIZE>1} if(in==out)  {if((in  +1)==BUF_SIZE
    &&chkPro!=chkCon)//buffer full
{continue;
} else if(lapPro!=lapCon)//buffer full
{continue;
}}
buffer[in]=nextProduced;//produce next item in buffer
    if(in  +1==BUF_SIZE)//Producer  completed  a  lap
    around the buffer
{lapPro=(lapPro+1) % 2//update the lap producer has
    completed 0 or 1}
in=(in +1) % BUF_SIZE;//move the in pointer to the next
    buffer position} while (1) {if(out+2==BUF_SIZE)//
    Consumer
records lap at n-2
{chkCon=lapCon;}
if(in==out)
{if((out+1)==BUF_SIZE  &&chkPro==chkCon)//buffer
    empty
{continue;} else if(lapPro==lapCon)//buffer empty
{continue;
}}
nextConsumed=buffer [out];//consume next item in buffer
    if((out+1)==BUF_SIZE)//The consumer completed a
    lap around the buffer
{lapCon=(lapCon+1) % 2//update the lap the consumer
    has completed 0 or 1}
```

```
out=(out+1) % BUF_SIZE;//move the out pointer to the
    next buffer position/*consume the item in nextCon-
    sumed*/}
```

As an example, below is the pseudo code for multiple slot reset.

```
while (1)
{/*produce another item in nextProduced*/if(overPro=1
    &&overCon=1)//safe overwrite condition, producer
    and consumer reset
{in=0;//reset in-ptr lapPro=0;//reset producer lap over-
    Pro=0;//producer reset complete}
else if(overPro==1| overCon=1)//Waiting on consumer
    reset flag {continue;
}
if(in +2=BUF_SIZE)
{
chkPro=lapPro;//mark lap two slots from start/finish for
    BUF_SIZE>1} if(in==out) {if((in +1)=BUF_SIZE
    &&chkPro!=chkCon)//buffer full
{overPro=1;//producer flags for overwrite continue;//reit-
    erate loop} else if(lapPro!=lapCon)//buffer full
{overPro=1;//producer flags for overwrite continue;//reit-
    erate loop}}
buffer[in]=nextProduced;//produce next item in buffer
    if(in +1=BUF_SIZE)//Producer completed a lap around
    the buffer
{lapPro=(lapPro+1) % 2//update the lap producer has
    completed 0 or 1}
in=(in +1) % BUF_SIZE;//move the in pointer to the next
    buffer position} while (1) {if(overPro==1 &&over-
    Con=1)//waiting on producer reset
{continue;
}
if(overPro=1)//check if producer is resetting
{out=0;//reset out-pointer lapCon=0;//reset consumer lap
    overCon=1;//consumer reset flag set continue;//re-iter-
    ate loop while producer resets} else if(overCon==1)//
    only update in this case
{overCon=0;//reset complete}
if(out+2=BUF_SIZE)//record consumer lap
{chkCon=lapCon;
if(in==out)//producer initiates reset if buffer full
{
continue;
}
nextConsumed=buffer [out];//consume next item in buffer
    if((out+1)==BUF_SIZE)//The consumer completed a
    lap around the buffer
{
lapCon=(lapCon+1) % 2//update the lap the consumer
    hascompleted 0 or 1
}
out=(out+1) % BUF_SIZE;//move the out pointer to the
    next buffer position/*consume the item in nextCon-
    sumed*/
}
```

As an example, below is the pseudo code for a single slot reset.

```
while (1)
{/*produce another item in nextProduced*/if(overPro==1
    &&overCon==1)//safe overwrite condition, producer
    and consumer reset
{lapPro=0;//reset producer lap
overPro=0;//reset producer flag
if(overpPro==1| overCon==1)//fix
wait on overCon to equal 0
{continue;
```

```
} if(lapPro!=lapCon)//buffer full
{overPro=1;//producer flags for reset continue; //reiterate
    loop
}
buffer[0]=nextProduced;//produce next item in buffer lap-
    Pro=(lapPro+1) % 2//update the lap producer has com-
    pleted 0 or 1} while (1) {if(overPro==1 &&over-
    Con==1)
{
continue;
}
if(overPro==1)//producer wants to overwrite old data
{
lapCon=0;//reset consumer lap overCon=1;
//consumer flags for reset continue;//reiterate loop
    else if(overCon==1)//only change in this case
        {
        overCon=0;//consumer resets flag
        }
    if(lapPro==lapCon)//buffer is empty
        {
        continue;
        } nextConsumed=buffer[0];//consume next item in buf-
            fer lapCon=(lapCon+1) % 2//update the lap the con-
            sumer has completed 0 or 1/*consume
            the item in nextConsumed*/}
```

In some embodiments, multiple slot reset consumer catch up may be implemented as a four-way handshake where all consumer condition variables out, lapCon, and chkCon are set to equal the producer's respective condition variables once the consumer entity 110 sees the producer entity's 108 flag OverPro set to 1. The producer entity 108 does not write until the four-way handshake is complete or in other words, the OverCon flag changes from 1 back to 0. This method has one less line of code than resetting all producer and consumer condition variables back to 0 except for the paperclip chkCon and chkPro which will be recorded at buffer size-2. The paperclip must be reset in the catch-up method because the reset values can be anywhere around the buffer including the location where lap changes occur. With the reset to 0, all variables are placed at the 0 location and the paperclip is recorded as normal before the lap change occurs. The four-way handshake is significant because both consumer entity 110 and producer entity 108 cease operations before reset and finally both consumer entity 110 and producer entity 108 restart operations after reset.

As an example, below is the pseudo code for multiple slot reset catch up.

```
    while (1)
    {/*produce
    another item in nextProduced*/if(overPro==1 &&over-
        Con==1)//safe overwrite condition, producer and con-
        sumer reset
    {overPro=0;//producer reset
    complete}
    if(overCon==1|overPro==1)//Waiting on consumer reset
        flag
    {continue;} if(in +2
    ==BUF_SIZE)
    {chkPro=lapPro;//update
    paperclip}
    if(in==out) {if((in +1)=BUF_SIZE &&chkPro!=
    chkCon)//buffer full
    {overPro=1;//producer flags for
    overwrite continue;//reiterate loop}
    else if(lapPro!=lapCon)//buffer
    full {overPro=1;//producer flags
```

```
    for overwrite continue;//reiterate
    loop}}
    buffer[in]=nextProduced;//produce next item in buffer
        if(in +1==BUF_SIZE)//Producer completed a lap
        around the buffer
    {lapPro=(lapPro+1) % 2//update the lap producer has
        completed 0 or 1}
    in=(in +1) % BUF_SIZE;//move the in pointer to the next
        buffer position} while (1)//consumer
    loop
    {if(overPro==1 &&overCon==1)//waiting on producer
        reset flag
    0
    {continue;
    }
    if(overPro==1)//check if producer is resetting
    {out=in;//reset out-pointer lapCon=
    lapPro;//reset consumer lap chkCon=
    chkPro;//reset consumer paperclip
    overCon=1;//consumer reset flag set
    continue;//re-iterate loop while producer
    resets}
    else if(overCon==1)//only update in this case
    {overCon=0;//reset complete}
    if(out+2==BUF_SIZE)//record consumer lap
    {chkCon=
    lapCon;
    } if(in==out)//producer initiates reset if buffer
    full
    {continue;
    }
    nextConsumed=buffer [out];//consume next item in buffer
        if((out+1)=BUF_SIZE)//The consumer completed a
        lap around the buffer
    {lapCon=(lapCon+1) % 2//update the lap the consumer
        has completed 0 or
    1}
    out=(out+1) % BUF_SIZE;//move the out pointer to the
        next buffer position/*consume
    the item in nextConsumed*/}
```

As an example, below is the pseudo code for single slot reset catch up.

```
    while (1)
    {
    /*produce another item in nextProduced*/if(overPro=1
        &&overCon=1)//indicate consumer handshake
    {
    overPro=0;//reset producer flag}
    if(overpPro==1||overCon==1)//wait on overCon to equal
        0
    {
    continue;
    } if(lapPro!=lapCon)//buffer
    full
    {
    overPro=1;//producer flags for reset
    continue;//reiterate loop
    }
    buffer[0]=nextProduced;//produce next item in buffer
        (lapPro+1) % 2//update the lap producer has completed
        0 or 1 lapPro=
    } while(1) {if(overPro==1
    &&overCon==1) {
    continue;
    }
    if(overPro==1)//producer wants to overwrite old data
    {
``` lapCon=lapPro;//reset consumer lap
overCon=1;//consumer flags for reset
continue;//reiterate loop
}
else if(overCon==1)//only change in this case
{
overCon=0;//consumer resets flag
}
if(lapPro==lapCon)//buffer is empty
{
continue;
}
nextConsumed=buffer[0];//consume next item in buffer
    lapCon=(lapCon+
1) % 2//update the lap the consumer has completed 0 or
    1/*consume the item in nextConsumed*/}

Figure 5B:
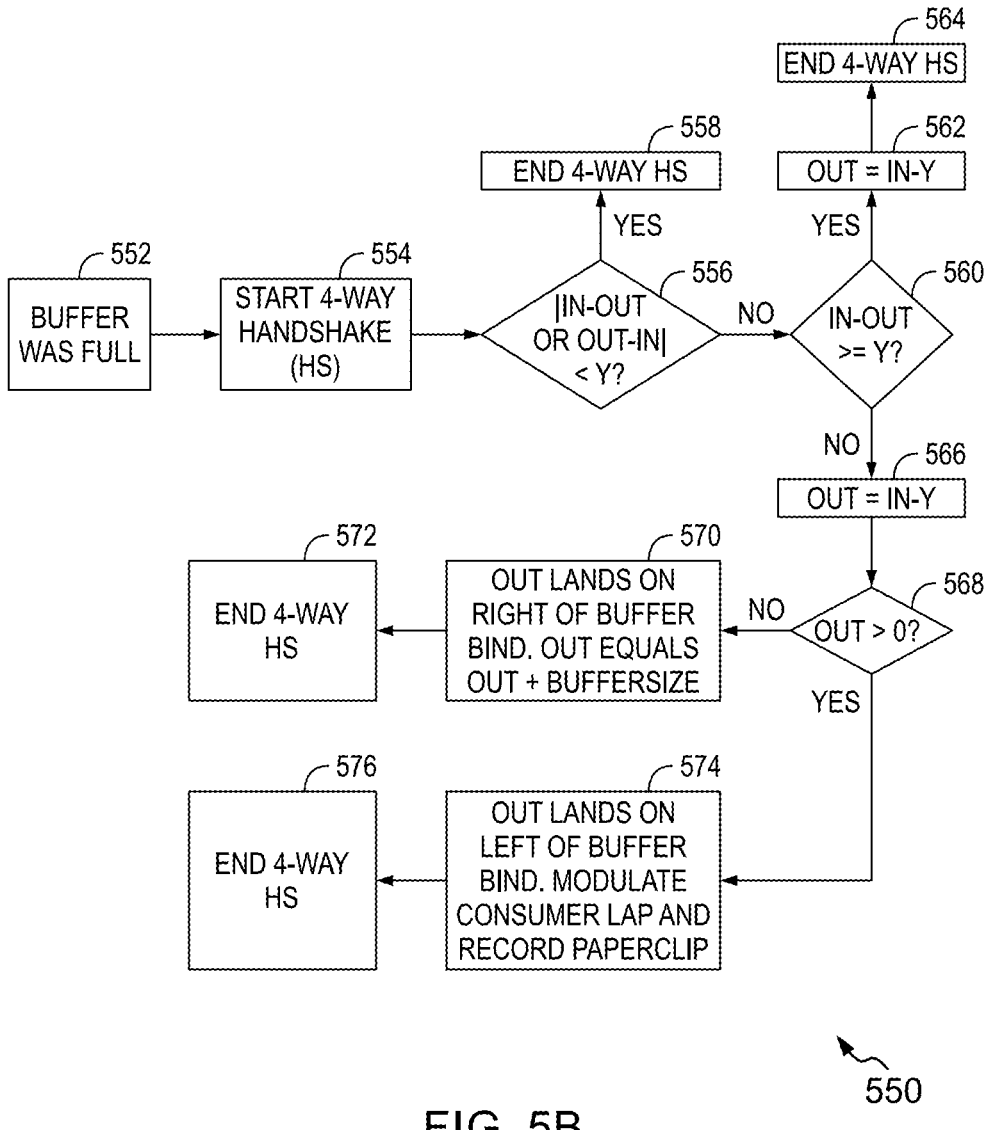
FIG. 5B illustrates a flow diagram of an example method for executing a four-way handshake with warp tuning logic in response to a full buffer condition, in accordance with embodiments of the present disclosure.

FIG. 5B illustrates a flow diagram of an example method 550 for executing a four-way handshake with warp tuning logic in response to a full buffer condition, in accordance with embodiments of the present disclosure. The method 550 depicted in the flow diagram may be executed by, for example, at least one server such as the server 102. Operations of the flow diagram of the method 550, and combinations of operations in the flow diagram of the method 550, may be implemented by, for example, hardware, firmware, a processor, circuitry, and/or a different device associated with the execution of software that includes one or more computer program instructions. The method 550 starts at operation 552.

At step 552, the method begins upon detection that the buffer is full and a reset condition has been triggered (e.g., through overwrite detection or a via dynamic flag). The four-way handshake is initiated between the producer and consumer entities 108 and 110, respectively at step 554. All buffer operations are paused during the four-way handshake. Warp tuning is then conducted while the buffer operations are paused to determine a safe repositioning of the pointers. Only after warp tuning completes, the four-way handshake concludes and buffer operations resume. In the four-way handshake, the producer entity 108 sets a flag (e.g., to 1) indicating the buffer is full. The consumer entity 110 acknowledges the buffer full condition and warps its pointer to a safe distance behind the producer's current location and then the producer entity 108 resumes write operation. This is crucial for maintaining a continuous flow of data, especially in real-time systems.

At step 556, the server 102 calculates an absolute difference (hereinafter also referred to as difference) between the positions of the in-pointer and the out-pointer (e.g., in==out or out—in, here "in" refers to current position of the in-pointer, "out" refers to current position of the out-pointer), and compares it with a predetermined warp distance threshold (e.g., Y) (hereinafter also referred to as a predetermined threshold). If a distance between the in-pointer and out-pointer is less than the predetermined threshold (e.g., in–out or out–in<Y), then it indicates that the consumer entity 110 is close enough to the producer entity 108 to avoid a full warp, then the server 102 proceeds to step 558, where the four-way handshake is finalized and operations resume.

At step 560, if the above condition is false, the server 102 checks if the absolute difference between the in-pointer and the out-pointer is greater than or equal to the predetermined threshold (e.g., in–out≥Y). This determines if the warp can be resolved by shifting the out-pointer to a safe distance i.e., Y behind the in-pointer, remaining within the same lap.

When in–out>=Y is true/yes, it means the in-pointer and out-pointer are already on the same lap, and the distance (e.g., Y) is either equal to the out-pointer or warps the out-pointer to the distance Y from the in-pointer within the same lap at step 562. Thus, the 4-way handshake ends immediately at step 564.

At step 560, if the difference between the in-pointer and the out-pointer is not greater than or equal to the predetermined threshold (e.g., in–out ≥Y is false/no), then the out-pointer must warp across the buffer boundary (e.g., cross zero). If in–out ≥Y is false, then the out-pointer must warp across the buffer boundary (such as cross zero). Warping means the out-pointer moves forward to the predetermined distance Y from the in-pointer to begin consuming again. The in-pointer is across zero pointer when this condition is false. Therefore, the out-pointer's distance from the in-pointer is either a completion of a lap or behind zero. At step 566, the out-pointer is set to in-pointer minus Y (e.g., out=in-Y, which means the consumer pointer is repositioned to a safe distance behind the producer pointer to preserve the most recent Y entries in the buffer, so that data within the Y range behind the in-pointer is preserved and not overwritten).

At step 568, the server 102 evaluates whether the warped-out pointer (i.e., whether a new value of the out-pointer) is greater than zero (e.g., out >0). In this buffer configuration, the bind occurs at slot zero and the logical addressing of the circular buffer proceeds counter-clockwise (e.g., 3→2→1→0→5→4). Therefore, the out-pointer value greater than zero indicates that the pointer has crossed the zero slot, effectively warping around to the left side of the buffer. In this case, the system records a paperclip and modulates the lap of the consumer entity 110. This ensures that both producer and consumer remain logically aligned in the buffer traversal across lap boundaries. For example, the server 102 determines that the warped out-pointer is positioned to the left of the buffer bind. If the out-pointer is greater than zero, it indicates that the warped-out pointer has crossed the buffer bind at the slot zero and landed on the left side of the buffer. In this configuration, crossing zero signifies a wraparound event, requiring a consumer lap modulation and recording of the paperclip to maintain synchronization.

If the out-pointer is greater than zero, then the server 102 modulates the lap of the consumer entity 110 (i.e., consumer lap indicator) and the consumer paperclip is recorded respectively at step 574. This lap modulation ensures synchronization between the producer entity 108 and the consumer entity 110 within a circular addressing space. In some implementations, instead of modulating the lap and recording a fresh paperclip, the consumer's lap and paperclip may be set equal to the in-pointer lap and the producer's paperclip, since the producer is always ahead in the buffer traversal. This allows for rapid realignment of the consumer state to match the current cycle of the producer. After this, the process proceeds to step 576. At step 576, the 4-way handshake is completed. By this stage, the consumer and producer pointers (e.g., out-pointer and in-pointer, respectively) are synchronized according to the warp rules, and a safe Y distance is guaranteed between them. The system exits the four-way handshake process and resumes normal buffer operation.

At step 568, if the out-pointer is less than zero, it means the out-pointer has landed below zero, potentially requiring normalization to avoid invalid indexing. If the out-pointer is less than zero (e.g., out<0), the server 102 corrects the out-pointer location by adding a total buffer size to the out-pointer (e.g., out=out+buffer size) at step 570. This normalization repositions the out-pointer within valid circular buffer bounds, ensuring safe addressable memory access. Once the warp normalization is complete, the server 102 proceeds to finalize the four-way handshake at step 572.

It is to be noted that, unlike prior versions of the four-way handshake process (as described in FIG. 5A), this implementation (as described in FIG. 5B) does not require resetting all condition variables to zero. The term "condition variable" refers to a software-controlled state or flag that tracks the condition or status of synchronization steps between the producer and consumer (e.g., flags for reset, pointer sync, handshake readiness). Since the pointer repositioning and lap modulation now occur based on threshold logic, and race conditions are avoided by executing warp tuning after pointer adjustments, such a reset is unnecessary.

Furthermore, FIG. 5B corrects the previous option, where the lap indicators for the producer and consumer were set to modulate laps after pointer increment. Instead, in the current approach (as described in FIG. 5B), warping occurs when the pointers move last in the order of operations, thereby preventing synchronization faults or race conditions during pointer handoff across buffer boundaries. The term pointer handoff used herein refers to a careful transfer of control or coordination between the producer and consumer when buffer pointers (e.g., read/write positions) are adjusted.

In some embodiments, when the buffer is full, the producer must pause or initiate a reset through the four-way handshake. FIG. 5B introduces a warp tuning mechanism as a third alternative. Warping initiates a reset through the four-way handshake to reposition the out-pointer to a safe distance (e.g., Y) behind the in-pointer. Both the buffer size and the value of Y can be adjusted or optimized as needed. In contrast to the reset module 216, which overwrites all data when the buffer is full with minimal packet loss, the warp mechanism overwrites only at the predetermined distance Y, when the buffer is full. It is to be noted that, overwrite is enabled at the predefined distance and the buffer size. Warping allows more granularity when overwriting with minimal packet loss.

Figure 6:
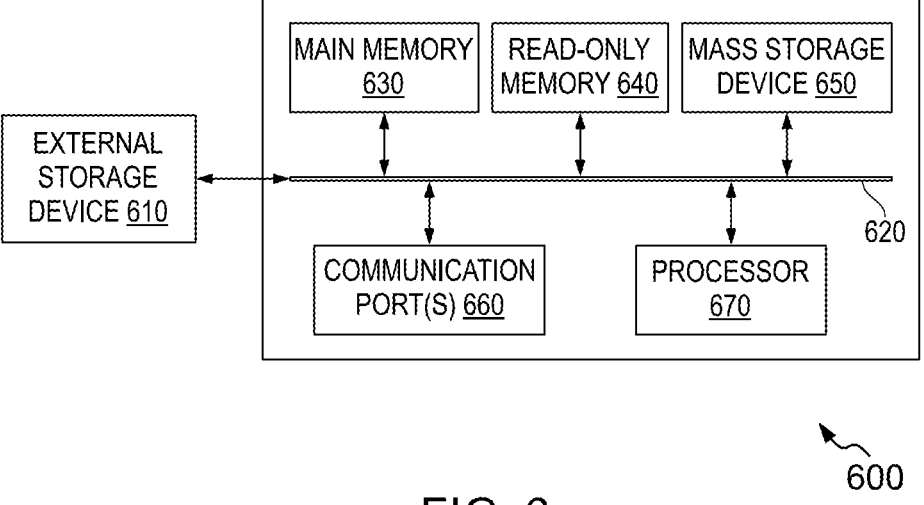
FIG. 6 illustrates an example computer system in which or with which embodiments of the present disclosure may be utilized in accordance with embodiments of the present disclosure.

FIG. 6 illustrates an example computer system 600 in which or with which embodiments of the present disclosure may be utilized in accordance with embodiments of the present disclosure. In some embodiments, the server 102 or the system 102 may be implemented as the computer system 600.

As shown in FIG. 6, the computer system 600 may include an external storage device 610, a bus 620, a main memory 630, a read-only memory 640, a mass storage device 650, communication port(s) 660, and a processor 670. A person skilled in the art will appreciate that the computer system 600 may include more than one processor and communication ports. The processor 670 may include various modules associated with embodiments of the present disclosure. The communication port(s) 660 may be any of an RS-232 port for use with a modem-based dialup connection, a 10/100 Ethernet port, a Gigabit or 10 Gigabit port using copper or fiber, a serial port, a parallel port, or other existing or future ports. The communication port(s) 660 may be chosen depending on a network, such as a Local Area Network (LAN), Wide Area Network (WAN), or any network to which the computer system 600 connects.

The main memory 630 may be a random-access memory (RAM), or any other dynamic storage device commonly known in the art. The read-only memory 640 may be any static storage device(s) e.g., but not limited to, a Programmable Read Only Memory (PROM) chips for storing static information e.g., start-up or Basic Input/Output System (BIOS) instructions for the processor 670. The mass storage device 650 may be any current or future mass storage solution, which can be used to store information and/or instructions. Exemplary mass storage device 650 includes, but is not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), one or more optical discs, Redundant Array of Independent Disks (RAID) storage, e.g. an array of disks.

The bus 620 communicatively couples the processor 670 with the other memory, storage, and communication blocks. The bus 620 may be, e.g. a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects the processor 670 to the computer system 600.

Optionally, operator and administrative interfaces, e.g. a display, keyboard, joystick, and a cursor control device, may also be coupled to the bus 620 to support direct operator interaction with the computer system 600. Other operator and administrative interfaces can be provided through network connections connected through the communication port(s) 660. The components described above are meant only to exemplify various possibilities. In no way should the aforementioned exemplary computer system 600 limit the scope of the present disclosure.

The methods described herein may be performed using the systems described herein. In addition, it is contemplated that the methods described herein may be performed using systems different than the systems described herein. Moreover, the systems described herein may perform the methods described herein and may perform or execute instructions stored in a non-transitory computer-readable storage medium (CRSM). The CRSM may comprise any electronic, magnetic, optical, or other physical storage device that stores executable instructions. The instructions may comprise instructions to cause a processor to perform or control the performance of operations of the proposed methods. It is also contemplated that the systems described herein may perform functions or execute instructions other than those described in relation to the methods and CRSMs described herein.

Furthermore, the CRSMs described herein may store instructions corresponding to the methods described herein and may store instructions which may be performed or executed by the systems described herein. Furthermore, it is contemplated that the CRSMs described herein may store instructions different than those corresponding to the methods described herein, and may store instructions which may be performed by systems other than the systems described herein.

The methods, systems, and CRSMs described herein may include the features or perform the functions described herein in association with any one or more of the other methods, systems, and CRSMs described herein.

In some embodiments, the method or methods described above may be executed or carried out by a computing system (for example, the computer system 600 of FIG. 6) including a tangible computer-readable storage medium, also described herein as a storage machine, that holds machine-readable instructions executable by a logic machine (i.e. a processor or programmable control device) to provide, implement, perform, and/or enact the above-described methods, processes and/or tasks. When such methods and processes are implemented, the state of the storage machine may be changed to hold different data. For example, the storage machine may include memory devices such as various hard disk drives, CDs, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that a certain task is to be executed by the computing system, such as requesting the computing system to display any of the above described information, or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

FIG. 7 illustrates a flow diagram of an exemplary computer-implemented method 700 for data synchronization using lapping with a paperclip (LWAP), in accordance with embodiments of the present disclosure. The method 700 introduces a synchronization mechanism wherein the producer and consumer entities 108 and 110 update their respective lap indicators and paperclip indicators or values to manage the data flow efficiently. The disclosed method 700 ensures that when the buffer reaches a critical state (i.e., full or empty), both entities 108 and 110 can update their operational states without race conditions, ensuring the timely transfer of data without overwriting or data loss. The method 700 depicted in the flow diagram may be executed by, for example, the server 102 or the system. Operations of the method 700 and combinations of operations in the flow diagram, may be implemented by, for example, hardware, firmware, a processor, circuitry and/or a different device associated with the execution of software that includes one or more computed program instructions.

At step 702 of method 700, the processor 202 determines the positions of the in-pointer and out-pointer. The in-pointer tracks where the producer entity 108 writes the data, while the out-pointer marks where the consumer entity 110 reads the data. Each of the in-pointer and the out-pointer is associated with a respective slot in the buffer (e.g., shared buffer or circular buffer) and must be monitored to ensure data integrity and synchronization. The pointer positions reflect the buffer's operational status, such as full, empty, or active, and are used to track traversal and synchronization events. If the in-pointer and out-pointer are not pointing to the same slot in the buffer, indicating that the buffer is in an active state, then the processor 202 enables concurrent access to the buffer by both the producer and consumer entities 108, 110, allowing simultaneous operations without conflict.

At step 704, the processor 202 records the producer lap indicator and the consumer lap indicator, each associated with the producer entity 108 and the consumer entity 110, respectively, in a first set of slots associated with the buffer. The term used herein "a first set of slots" refers to the specific buffer slots that are used to record the lap indicators (e.g., the producer lap indicator and the consumer lap indicator). These lap indicators represent how many complete traversals (laps) each pointer has made around the buffer. The first set of slots may be reserved at specific positions, such as the last slot of the buffer where lap change occurs, while the paperclip indicators are recorded just before the last slot. (e.g., slot 0 for lap changes and/or the second-last slot for paperclip recording).

At step 706, the processor 202 determines a modulated lap value of each producer and the consumer lap indicator (e.g., using binary toggling per traversal). The modulated lap value is determined at least on the in-pointer and the out-pointer associated with the corresponding producer entity 108 and consumer entity 110 traversal along each slot in the buffer, the modulated lap value being stored in a producer paperclip indicator and a consumer paperclip indicator, respectively. The producer paperclip indicator and the consumer paperclip indicator are recorded in a second set of slots associated with the buffer. This recording step ensures that the lap state is preserved and can be referenced later for race condition prevention.

Each of the producer and the consumer lap indicator toggles between binary states while the respective in-pointer and the out-pointer complete traversal along each slot in the buffer. The modulation of each producer and the consumer lap indicator occurs at the last buffer slot before the pointer moves forward, while the corresponding producer and consumer paperclip indicators are recorded just before reaching the last slot (e.g., slot 0 or the penultimate slot). The paperclip is only used at the last buffer slot to where lap change takes place. The method ensures that any subsequent comparisons particularly during slot overlap are based on an accurate record of traversal state, not on a potentially updated or future state.

The processor 202 also determines the modulated lap value, derived from the consumer lap indicator, the producer lap indicator and the pointer position, and stores the modulated lap value in a paperclip indicator specific to either the producer 108 or consumer 110 entity. These paperclip indicators are recorded in the second set of slots associated with the buffer, separate from the first set of slots. This dual-layer tracking mechanism enables precise detection of the synchronization state, especially when the in-pointer and the out-pointer reference the same slot. The use of modulated values allows the system to disambiguate between an empty and full buffer when pointers are equal.

At step 708, the processor 202 detects a race condition based at least on the in-pointer and the out-pointer being referenced to a single slot within the buffer (e.g., the same slot in the buffer). When both pointers point to the same slot, the processor 202 cannot rely solely on positional data to assess whether the buffer is full or empty, and additional contextual information is required. To resolve this ambiguity, the processor 202 compares the producer paperclip indicator with the consumer paperclip indicator at the last buffer slot when pointers are equal there, otherwise, the processor 202 compares the lap indicators when the pointers are equal at any other slot. This allows the processor 202 to infer whether the buffer is full or empty whenever the in-pointer and out-pointer reference the same slot.

If there is a disparity between the paperclip indicators, it indicates that the producer and consumer have not synchronized correctly, and further resolution is needed. In an implementation, the processor 202 records the producer paperclip indicator or the consumer paperclip indicator by storing the lap value at slot zero and references the stored lap value at the last buffer slot to determine true lap status during pointer overlap. This mechanism ensures accurate interpretation of the buffer state when both pointers are aligned, and it helps distinguish between a legitimate buffer full/empty condition and a synchronization fault.

At step 710, following the detection and evaluation of a race condition in the buffer, the processor 202 determines a sequence to access the buffer. This involves deciding whether the producer entity 108 or the consumer entity 110 is permitted to proceed with accessing the shared buffer space. The processor 202 resolves the race condition based on a comparison of the producer paperclip indicator and the consumer paperclip indicator at the last buffer slot to determine a valid sequence for buffer access (e.g., the correct sequence for accessing the buffer).

In some implementations, the processor 202 computes the warp distance between the in-pointer and out-pointer, representing how far apart they are in terms of buffer slots. The warp distance is a difference between the positions of the in-pointer and out-pointer. The processor 202 calculates whether an offset value exists between the in-pointer and the out-pointer, measured with respect to zero. Further, the processor 202 determines whether an absolute value of the offset value is equivalent to a predetermined threshold. If the warp distance satisfies the threshold, the processor 202 updates the out-pointer along with its respective lap indicator and paperclip indicator. In response to the warp distance being equivalent to the predetermined threshold, the processor 202 adjusts the out-pointer to a position offset from the in-pointer by the preset offset range (e.g., Y), ensuring that data within the preset offset range is preserved, while all data outside the range is eligible for overwriting. The preset offset range can be fixed based on desired tuning or even dynamically tuned according to desired thresholds by invoking a dynamic flag in the producer entity 108 to initiate the four-way handshake and update the present offset range.

Further, in response to the updating step or in response to a synchronization signal or event initiated by an internal or external source, the processor 202 adjusts the buffer configuration. The synchronization signal could originate from the internal or external source, prompting actions such as resizing the buffer, resetting one or more of the producer lap indicator, the consumer lap indicator, the producer paperclip indicator, the consumer paperclip indicator, or repositioning the in-pointer and out-pointer to maintain data integrity and synchronization. The processor 202 enables dynamic tuning of the warp distance and buffer size through the dynamic flag. The dynamic flag triggers an adjustment to the buffer configuration, allowing the system to adjust parameters such as the buffer size or warp distance in response to dynamic flag parameters.

Further, the processor 202 enables the continuation of buffer operations during interrupts or context switches by restoring the access states from the previously recorded lap indicators and paperclip indicators, ensuring that the producer and consumer entities 108, and 110 can continue buffer operations without losing synchronization. The state of the buffer exists within the respective pointers, laps, and paperclips, allowing operations to proceed seamlessly during a producer or consumer interrupt based on this preserved buffer state. However, an interrupt occurring during the four-way handshake may cause the system to busy wait until the interrupt completes, ensuring the handshake process is properly finalized.

The processor 202 evaluates the dynamic flag prior to updating at least one of the in-pointer, out-pointer, or synchronization indicators such as lap indicators, and paperclip indicators. If the dynamic flag is active, the processor 202 updates the buffer configuration based on the one or more dynamic flag parameters received via the dynamic flag, ensuring consistency across buffer operations. The processor 202 also ensures that dynamic buffer size or dynamic warp distance is adjusted according to one or more dynamic flag parameters received from the producer via the dynamic flag, maintaining efficient synchronization. The one or more dynamic flag parameters include at least a dynamic buffer size and a dynamic warp distance value associated with the producer.

Further, the processor 202 initiates a synchronization signal via the dynamic flag received from the producer entity 108. The dynamic flag triggers a four-way handshake for performing warp tuning or buffer reset.

Further, the processor 202 triggers the four-way handshake when the dynamic flag (also referred to as dynamic flag function call) signals the need for buffer reconfiguration. Specifically, if the dynamic buffer size differs from a default value, then the global buffer size equals the dynamic buffer size. The dynamic flag function call is typically placed as the last line before the dynamic statement in the producer code to ensure the completion of any ongoing handshake before initiating a new one. This call invokes the four-way handshake with the consumer's dynamic flag, which is positioned at the very top of the consumer code, above the consumer's dynamic statement, ensuring that the consumer detects the dynamic flag on its next attempt to access the buffer. When both the producer and consumer binary dynamic flags equal 1, the consumer and producer change their respective variables within their dynamic statements. During this four-way handshake, both the producer and consumer pause their buffer operations, allowing the processor 202 to update the synchronization parameters such as the lap indicators and paperclip indicators. The four-way handshake also includes tuning buffer configuration parameters like warp distance, buffer size, or other parameters based on the values received from the dynamic flag.

Further, the processor 202 detects whether the buffer size has decreased or not. If so, the processor 202 adjusts the positions of the in-pointer and out-pointer that exceed the new buffer size. The pointers are wrapped around to the new last buffer slot. In response to detecting that the buffer size has decreased, the processor 202 modifies the positions of any pointers greater than the new buffer size minus one, ensuring that these pointers warp around to the last buffer slot. All other synchronization indicators such as the lap and paperclip indicators remain unchanged. This is due to the seamless lap change at the last buffer slot and the consistent recording of the paperclip indicators at slot zero.

Finally, the processor 202 initiates a buffer reset based on the dynamic flag. The buffer reset can occur regardless of the current state of the buffer, allowing the producer entity 108 to bypass full or empty buffer state checks. External instructions or signals received via the dynamic flag trigger the buffer reset. The processor 202 initiates the buffer reset based on the dynamic flag, regardless of the current state of the buffer, allowing the producer entity 108 to override full or empty buffer state checks in response to external instructions or signals. Altogether, the aforementioned operations ensure that the buffer remains in a consistent and operable state, supporting efficient, low-latency communication between producer and consumer entities 108, 110 in varying runtime environments.

In an alternative embodiment to the method described above in FIG. 7, the processor 202 may implement a wait-free lapping and warping mechanism that enables continuous data operations without the need of a four-way handshake. In this wait-free mode, the buffer is logically preset to be empty whenever the in-pointer equals the out-pointer, allowing the producer entity 108 to write immediately without collision. If the buffer is technically full, an overwrite is automatically performed using the warping mechanism. The warping operation includes subtracting a predefined threshold distance (e.g., Y) from the in-pointer, and if the resulting value is less than zero, adding the buffer size to normalize the out-pointer position within valid bounds before incrementing the in-pointer. If Y is default zero, then the entire buffer is simply overwritten whenever the in-pointer equals the out-pointer.

Since many modifications, variations, and changes in detail can be made to the described preferred embodiments of the disclosure, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A method for lock-free data synchronization, comprising:

determining, by a processor, a position of an in-pointer associated with a producer entity and an out-pointer associated with a consumer entity, wherein each of the in-pointer and the out-pointer is associated with a respective slot within a buffer, wherein the position of each of the in-pointer and the out-pointer indicates a status of the buffer;

recording, by the processor, a producer lap indicator and a consumer lap indicator associated with the producer entity and the consumer entity, respectively, in a first set of slots associated with the buffer;

determining, by the processor, a modulated lap value of each of the producer lap indicator and the consumer lap indicator, wherein the modulated lap value is determined at least on the in-pointer and the out-pointer associated the corresponding producer entity and consumer entity traverse along each slot in the buffer, the modulated lap value being stored in a producer paperclip indicator and a consumer paperclip indicator, respectively, and wherein the producer paperclip indicator and the consumer paperclip indicator are recorded in a second set of slots associated with the buffer;

detecting, by the processor, a race condition based at least on the in-pointer and the out-pointer being referenced to a single slot within the buffer, and comparing the producer paperclip indicator and the consumer paperclip indicator at the single slot; and determining, by the processor, a sequence to access the buffer upon addressing the race condition.

2. The method as claimed in claim 1, wherein the each of the producer lap indicator and the consumer lap indicator toggles between binary states while the respective in-pointer and the out-pointer completes traversal along each slot in the buffer, and wherein the modulation of each of the producer lap indicator and the consumer lap indicator and updating of the corresponding producer paperclip indicator and consumer paperclip indicator are performed prior to traversal of the respective in-pointer and out-pointer along the buffer.

3. The method as claimed in claim 1, wherein recording, by the processor, the producer paperclip indicator or the consumer paperclip indicator comprises storing the respective lap value at slot zero and referencing the stored value at a last buffer slot for determining true lap status during pointer overlap.

4. The method as claimed in claim 1, further comprising:

computing, by the processor, a warp distance based on a difference between the position of each of the in-pointer and the out-pointer within the buffer;

updating, by the processor, at least one of the in-pointer, the out-pointer, the producer lap indicator, the consumer lap indicator, the producer paperclip indicator, the consumer paperclip indicator based on determining the warp distance being equivalent to a predetermined condition;

adjusting, by the processor, a configuration of the buffer in response to the updating step or in response to a synchronization signal initiated by an internal or external source, the adjustment comprising at least one of: resizing the buffer, resetting one or more of the producer lap indicator, the consumer lap indicator, the producer paperclip indicator, the consumer paperclip indicator, the in-pointer, or the out-pointer, or repositioning the in-pointer and the out-pointer; and enabling, by the processor, a continuation of buffer operations by the producer or the consumer entity during an interrupt or context switch by restoring access states from previously recorded lap and paperclip indicators, wherein overwrite is enabled at a predefined distance.

5. The method as claimed in claim 2, further comprising:

calculating, by the processor, an offset value between the position of each of the in-pointer and the out-pointer; and determining, by the processor, whether an absolute value of the offset value is equivalent to a predetermined threshold.

6. The method as claimed in claim 3, further comprising:

adjusting, by the processor, the out-pointer to a position offset from the in-pointer by a preset offset range in response to determining the warp distance being equivalent to the predetermined threshold, wherein the preset offset range is fixed or configured dynamically through a producer function call invoked by the producer entity comprising a dynamic flag.

7. The method as claimed in claim 6, further comprising facilitating, by the processor, concurrent access to the buffer to each of the producer entity and the consumer entity based on determining the position of the in-pointer being not equal to the position of the out-pointer, wherein the position of the in-pointer being not equal to the position of the out-pointer indicates the buffer is in an active state.

8. The method as claimed in claim 6, further comprising:

evaluating, by the processor, the dynamic flag prior to updating at least one of the in-pointer, the out-pointer, the producer lap indicator, the consumer lap indicator, the producer paperclip indicator, and the consumer paperclip indicator; and in response to the dynamic flag being active, updating, by the processor, a buffer configuration based on one or more dynamic flag parameters, wherein the one or more dynamic flag parameters comprise at least a dynamic buffer size and a dynamic warp distance value associated with the producer.

9. The method as claimed in claim 8, further comprising initiating, by the processor, the synchronization signal using the dynamic flag received from the producer entity, wherein the synchronization signal triggers a four-way handshake for performing warp tuning or buffer reset.

10. The method as claimed in claim 9, further comprising:

facilitating, by the processor, ceasing of buffer access operations to the producer entity and the consumer entity; and tuning, by the processor, buffer configuration parameters based on the dynamic flag, the buffer configuration parameters comprising a warp distance and buffer size.

11. The method as claimed in claim 1, further comprising:

determining, by the processor, a size of the buffer;

modifying, by the processor, in response to detecting the decreased buffer size, a position of at least the in-pointer and the out-pointer that exceed or equal a new buffer size to wrap around to the last buffer slot; and updating, by the processor, the corresponding lap indicators and paperclip indicators accordingly to reflect a new buffer configuration.

12. The method as claimed in claim 1, further comprising:

initiating, by the processor, a buffer reset based on the dynamic flag, regardless of a current state of the buffer; and enabling, by the processor, the producer entity to override full or empty buffer state checks based on external instructions/signals received through the dynamic flag.

13. A system for lock free data synchronization, comprising:

a memory unit comprising machine-readable instructions; and a processor operably connected to the memory unit, the processor configured to execute the machine-readable instructions, the machine-readable instructions when executed by the processor, cause the system to:

determine a position of an in-pointer associated with a producer entity and an out-pointer associated with a consumer entity, wherein each of the in-pointer and the out-pointer is associated with a respective slot within a buffer, and the position of each pointer indicates a status of the buffer, record a producer lap indicator and a consumer lap indicator associated with the producer entity and consumer entity, respectively, in a first set of slots associated with the buffer, determine a modulated lap value of each of the producer lap indicator and the consumer lap indicator, wherein the modulated lap value is determined at least on the in-pointer and the out-pointer associated the corresponding producer entity and consumer entity traverse along each slot in the buffer, the modulated lap value being stored in a producer paperclip indicator and the consumer paperclip indicator are recorded in a second set of slots associated with the buffer, detect a race condition based at least on the in-pointer and the out-pointer being referenced to a single slot within the buffer, and compare the producer paperclip indicator and the consumer paperclip indicator at the single slot, and determine a sequence to access the buffer upon addressing the race condition.

14. The system as claimed in claim 13, wherein each of the producer lap indicator and the consumer lap indicator toggles between binary states while the respective in-pointer and the out-pointer completes traversal along each slot in the buffer, and wherein the modulation of each of the producer lap indicator and the consumer lap indicator and updating of the corresponding producer paperclip indicator and consumer paperclip indicator are performed prior to traversal of the respective in-pointer and out-pointer along the buffer.

15. The system as claimed in claim 13, wherein the processor is further configured to record the producer paperclip indicator or the consumer paperclip indicator by storing the respective lap value at slot zero and referencing the stored value at a last buffer slot to determine true lap status during pointer overlap.

16. The system as claimed in claim 13, wherein the process is further configured to:

compute a warp distance based on a difference between the position of each of the in-pointer and the out-pointer within the buffer;

update at least one of the in-pointer, the out-pointer, the producer lap indicator, the consumer lap indicator, the producer paperclip indicator, or the consumer paperclip indicator based on determining that the warp distance is equivalent to a predetermined condition;

adjust a configuration of the buffer in response to the updating step or in response to a synchronization signal initiated by an internal or external source, the adjustment comprising at least one of: resizing the buffer, resetting one or more of the producer lap indicator, the consumer lap indicator, the producer paperclip indicator, the consumer paperclip indicator, the in-pointer, or the out-pointer, or repositioning the in-pointer and the out-pointer; and enable a continuation of buffer operations by the producer or consumer entity during an interrupt or context switch by restoring access states from previously recorded lap and paperclip indicators, wherein overwrite is enabled at a predefined distance.

17. The system as claimed in claim 14, wherein the processor is further configured to:

calculate an offset value between the position of each of the in-pointer and the out-pointer; and determine whether an absolute value of the offset value is equivalent to a predetermined threshold.

18. The system as claimed in claim 15, wherein the processor is further configured to:

adjust the out-pointer to a position offset from the in-pointer by a preset offset range in response to the warp distance being equivalent to the predetermined threshold, wherein the preset offset range is fixed or configured dynamically through a producer function call invoked by the producer entity comprising a dynamic flag.

19. The system as claimed in claim 18, wherein the processor is further configured to facilitate concurrent access to the buffer by the producer and consumer entities based on determining that the in-pointer is not equal to the out-pointer, such inequality indicating that the buffer is in an active state.

20. The system as claimed in claim 18, wherein the processor is further configured to:

evaluate the dynamic flag prior to updating at least one of the in-pointer, the out-pointer, the producer lap indicator, the consumer lap indicator, the producer paperclip indicator, and the consumer paperclip indicator; and update, in response to the dynamic flag being active, a buffer configuration based on one or more dynamic flag parameters, wherein the one or more dynamic flag parameters comprise at least a dynamic buffer size, a dynamic warp distance value associated with the producer.

21. The system as claimed in claim 20, wherein the processor is further configured to initiate the synchronization signal via the dynamic flag received from the producer entity, wherein the dynamic flag triggers a four-way handshake for performing warp tuning or buffer reset.

22. The system as claimed in claim 21, wherein the processor is further configured to:

facilitate ceasing of buffer access operations to the producer entity and the consumer entity; and tune buffer configuration parameters based on the dynamic flag, the buffer configuration parameters comprising a warp distance and buffer size.

23. The system as claimed in claim 13, wherein the processor is further configured to:

determine a size of the buffer;

modify, in response to detection of the decreased buffer size, a position of at least the in-pointer and the out-pointer that exceed or equal a new buffer size to wrap around to the last buffer slot; and update the corresponding lap indicators and paperclip indicators accordingly to reflect the new buffer configuration.

24. The system as claimed in claim 13, wherein the processor is configured to:

initiate a buffer reset based on the dynamic flag, regardless of a current state of the buffer; and enable the producer entity to override full or empty buffer state checks based on external instructions/signals received through the dynamic flag.

25. A non-transitory computer-readable storage medium, comprising machine-readable instructions, the machine-readable instructions when executed by a processor of a system enable the system to perform a method comprising steps of:

determine a position of an in-pointer associated with a producer entity and an out-pointer associated with a consumer entity, wherein each of the in-pointer and the out-pointer is associated with a respective slot within a buffer, and the position of each pointer indicates a status of the buffer;

record a producer lap indicator and a consumer lap indicator associated with the producer entity and consumer entity, respectively, in a first set of slots associated with the buffer;

determine a modulated lap value of each of the producer lap indicator and the consumer lap indicator, wherein the modulated lap value is determined at least on the in-pointer and the out-pointer associated the corresponding producer entity and consumer entity traverse along each slot in the buffer, the modulated lap value being stored in a producer paperclip indicator and the consumer paperclip indicator are recorded in a second set of slots associated with the buffer;

detect a race condition based at least on the in-pointer and the out-pointer being referenced to a single slot within the buffer, and compare the producer paperclip indicator and the consumer paperclip indicator at the single slot; and determine a sequence to access the buffer upon addressing the race condition.

\* \* \* \* \*